(12) United States Patent
Naokawa

(10) Patent No.: US 12,537,140 B2
(45) Date of Patent: Jan. 27, 2026

(54) MULTILAYER CERAMIC CAPACITOR

(71) Applicant: KYOCERA CORPORATION, Kyoto (JP)

(72) Inventor: Satoru Naokawa, Yasu (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 19/191,004

(22) Filed: Apr. 28, 2025

(65) Prior Publication Data

US 2025/0253098 A1 Aug. 7, 2025

Related U.S. Application Data

(63) Continuation-in-part of application No. PCT/JP2024/013497, filed on Apr. 1, 2024.

(30) Foreign Application Priority Data

Apr. 7, 2023 (JP) .................................. 2023-063037
Jun. 27, 2023 (JP) .................................. 2023-105304

(51) Int. Cl.
*H01G 4/30* (2006.01)
*H01G 4/012* (2006.01)
*H01G 4/232* (2006.01)

(52) U.S. Cl.
CPC ............... *H01G 4/30* (2013.01); *H01G 4/012* (2013.01); *H01G 4/232* (2013.01)

(58) Field of Classification Search
CPC .......... H10G 4/30; H10G 4/008; H01G 4/232; H01G 4/012; H01G 4/005

USPC ........................ 361/301.4, 321.1, 306.3, 303
See application file for complete search history.

(56) References Cited

U.S. PATENT DOCUMENTS

| | | | |
|---|---|---|---|
| 2005/0046536 A1* | 3/2005 | Ritter | C25D 7/00 336/200 |
| 2006/0039097 A1 | 2/2006 | Satou | |
| 2010/0302704 A1 | 12/2010 | Ogawa et al. | |
| 2013/0063862 A1* | 3/2013 | Kim | H01G 4/30 156/182 |
| 2014/0293503 A1 | 10/2014 | Sasabayashi et al. | |

(Continued)

FOREIGN PATENT DOCUMENTS

| | | |
|---|---|---|
| JP | 2006-060148 A | 3/2006 |
| JP | 2006-237078 A | 9/2006 |

(Continued)

*Primary Examiner* — Arun Ramaswamy
(74) *Attorney, Agent, or Firm* — Volpe Koenig

(57) ABSTRACT

A multilayer ceramic capacitor includes a laminate that includes an active portion formed by laminating dielectric layers and internal electrode layers, first and second covering portions that are positioned at respective ends of the active portion in a laminating direction, first and second surfaces, first and second end surfaces, first and second side surfaces. The multilayer ceramic capacitor also includes external electrodes. The first covering portion includes first and second dummy electrodes. The second covering portion includes third and fourth dummy electrodes. The first and third dummy electrodes are exposed at the first end surface. The second and fourth dummy electrodes are exposed at the second end surface. At least one of the first to fourth dummy electrodes has a greater thickness than a thickness of the internal electrode layers.

18 Claims, 26 Drawing Sheets

(56) References Cited

U.S. PATENT DOCUMENTS

| | | | |
|---|---|---|---|
| 2018/0182551 A1* | 6/2018 | Ahn | H01G 4/12 |
| 2019/0051459 A1* | 2/2019 | Mizuno | H01G 4/1227 |
| 2020/0118758 A1* | 4/2020 | Kim | H01G 4/30 |
| 2021/0065977 A1* | 3/2021 | Kim | H01G 4/232 |
| 2022/0293342 A1 | 9/2022 | Hirao | |

FOREIGN PATENT DOCUMENTS

| | | | |
|---|---|---|---|
| JP | 2007-036003 A | 2/2007 |
| JP | 2008-041786 A | 2/2008 |
| JP | 2010-278373 A | 12/2010 |
| JP | 2013-093374 A | 5/2013 |
| JP | 2014-212298 A | 11/2014 |
| JP | 2022139484 A | 9/2022 |
| WO | 2024/210103 A1 | 10/2024 |

* cited by examiner

MULTILAYER CERAMIC CAPACITOR

CROSS-REFERENCE TO RELATED PATENT APPLICATION

This application is a continuation in part of PCT International Application No. PCT/2024/013497, filed on Apr. 1, 2024, which claims priority to Japanese Application No. 2023-063037, filed on Apr. 7, 2023 and Japanese Application No. 2023-105304, filed on Jun. 27, 2023, the entire contents of which are hereby incorporated by reference.

BACKGROUND OF THE INVENTION

1. Field of the Invention

The present disclosure relates to a multilayer ceramic capacitor.

2. Description of the Related Art

The related-art technique of a multilayer ceramic capacitor is described in, for example, Japanese Unexamined Patent Application Publication No. 2014-212298.

SUMMARY OF THE INVENTION

According to the present disclosure, a multilayer ceramic capacitor includes a laminate having a substantially rectangular parallelepiped shape. The laminate includes an active portion formed by alternately laminating dielectric layers and internal electrode layers, a first covering portion and a second covering portion that are positioned at respective ends of the active portion in a laminating direction of the dielectric layers and the internal electrode layers, a first surface and a second surface that face each other in the laminating direction, a first end surface and a second end surface that face each other, and a first side surface and a second side surface that face each other. The multilayer ceramic capacitor also includes a first external electrode extending from the first end surface to the first surface, the second surface, the first side surface, and the second side surface, and a second external electrode extending from the second end surface to the first surface, the second surface, the first side surface, and the second side surface. The first external electrode and the second external electrode are connected to different internal electrode layers out of the internal electrode layers. The first covering portion includes a first dielectric portion and a first dummy electrode and a second dummy electrode positioned at respective ends of the first dielectric portion in a first direction perpendicular to the first end surface. The second covering portion includes a second dielectric portion and a third dummy electrode and a fourth dummy electrode positioned at respective ends of the second dielectric portion in the first direction. The first dummy electrode and the third dummy electrode are exposed at the first end surface, and the second dummy electrode and the fourth dummy electrode are exposed at the second end surface. At least one selected from the group consisting of the first dummy electrode, the second dummy electrode, the third dummy electrode, and the fourth dummy electrode has a greater thickness than a thickness of the internal electrode layers.

BRIEF DESCRIPTION OF THE DRAWINGS

The purpose, features, and advantages of the present disclosure will be further clarified from the following detailed description and the drawings.

DESCRIPTION OF THE PREFERRED EMBODIMENTS

Figure 1:
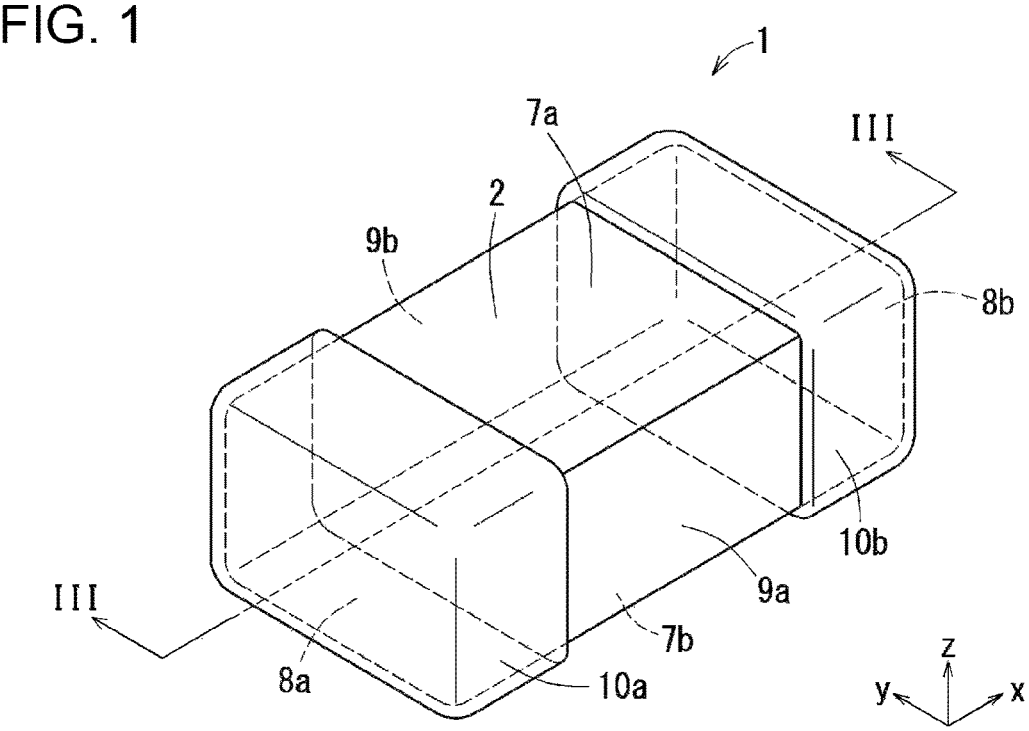
FIG. 1 is a perspective view illustrating a multilayer ceramic capacitor according to the present embodiment.

A multilayer ceramic capacitor includes a laminate formed by alternately laminating dielectric layers and internal electrode layers and an external electrode formed on a surface of the laminate and connected to the internal electrode layers. The size of the multilayer ceramic capacitor can be reduced when the external electrode is formed of a plated film. However, a bonding force between the laminate and the plated film is weak. Thus, the plated film may peel off. Japanese Unexamined Patent Application Publication No. 2014-212298 described above discloses a technique in which a plurality of dummy electrode layers to be bonded to the plated film is provided in the laminate so as to improve the bonding force between the laminate and the plated film.

In the related-art manufacturing steps of the multilayer ceramic capacitor, for sufficiently exposing the internal electrode layers on the surface of the laminate, a step of barrel polishing of the laminate is included after an unfired laminate has been fired. In the multilayer ceramic capacitor described in Japanese Unexamined Patent Application Publication No. 2014-212298, many interfaces of different materials between the dielectric layers and the dummy electrode layers exist at a corner portion of the laminate. Accordingly, when a colliding force against a polishing medium and another laminate applied to the corner portion of the laminate excessively increases, interlayer peeling may occur between the dielectric layers and the dummy electrode layers. This may degrade reliability of the multilayer ceramic capacitor.

Hereinafter, embodiments of a multilayer ceramic capacitor according to the present disclosure will be described with reference to the drawings. The drawings to be used for the following description are schematic. For example, ratios between the dimensions in the drawings are not necessarily coincident with actual ratios. Although any direction may be defined as an upper or lower direction for a multilayer ceramic electronic component according to the embodiments, for convenience, x, y, and z of a rectangular coordinate system are defined in some drawings in the present specification. In the following description, a positive side in the z axis direction may be defined as the upper side and a term such as an upper surface or a lower surface may be used. The x axis direction may also be referred to as a first direction or a longitudinal direction. The y axis direction may also be referred to as a second direction or a width direction. The z axis direction may also be referred to as a third direction, a height direction, or a laminating direction.

Figure 2:
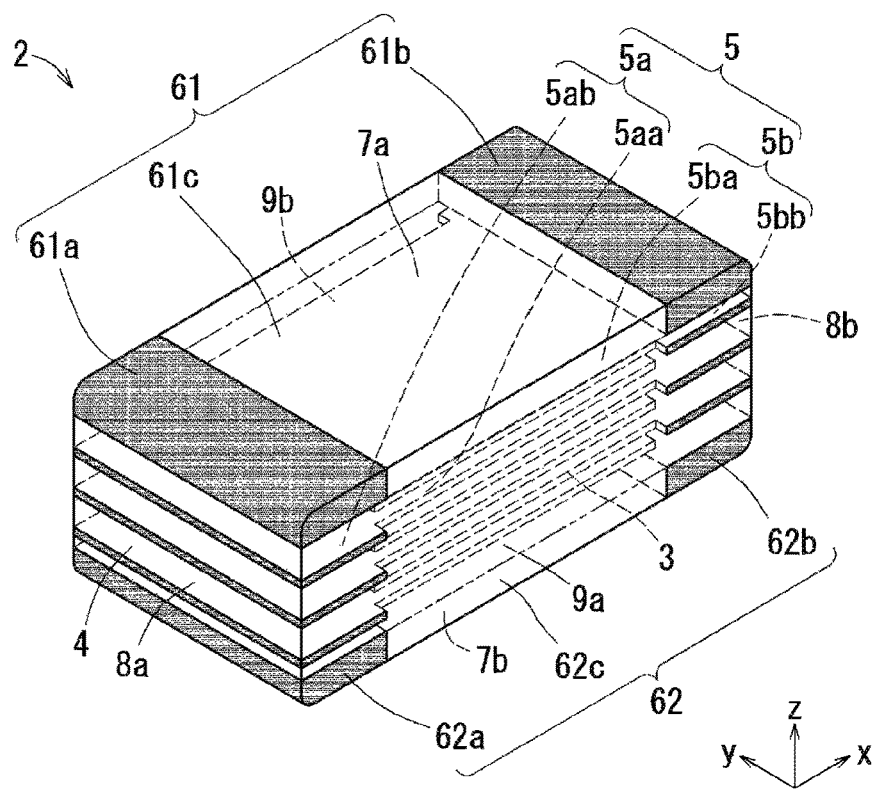
FIG. 2 is a perspective view illustrating a laminate of the multilayer ceramic capacitor illustrated in FIG. 1.
Figure 3:
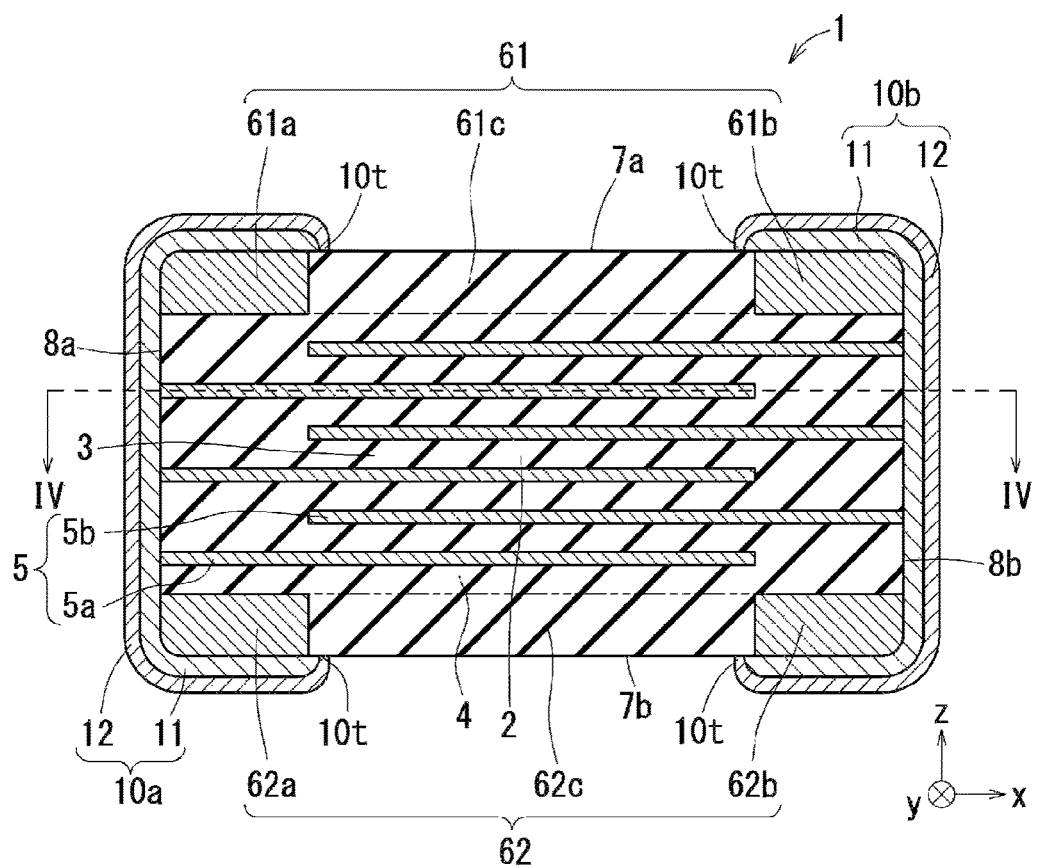
FIG. 3 is a sectional view taken along line III-III illustrated in FIG. 1.
Figure 4:
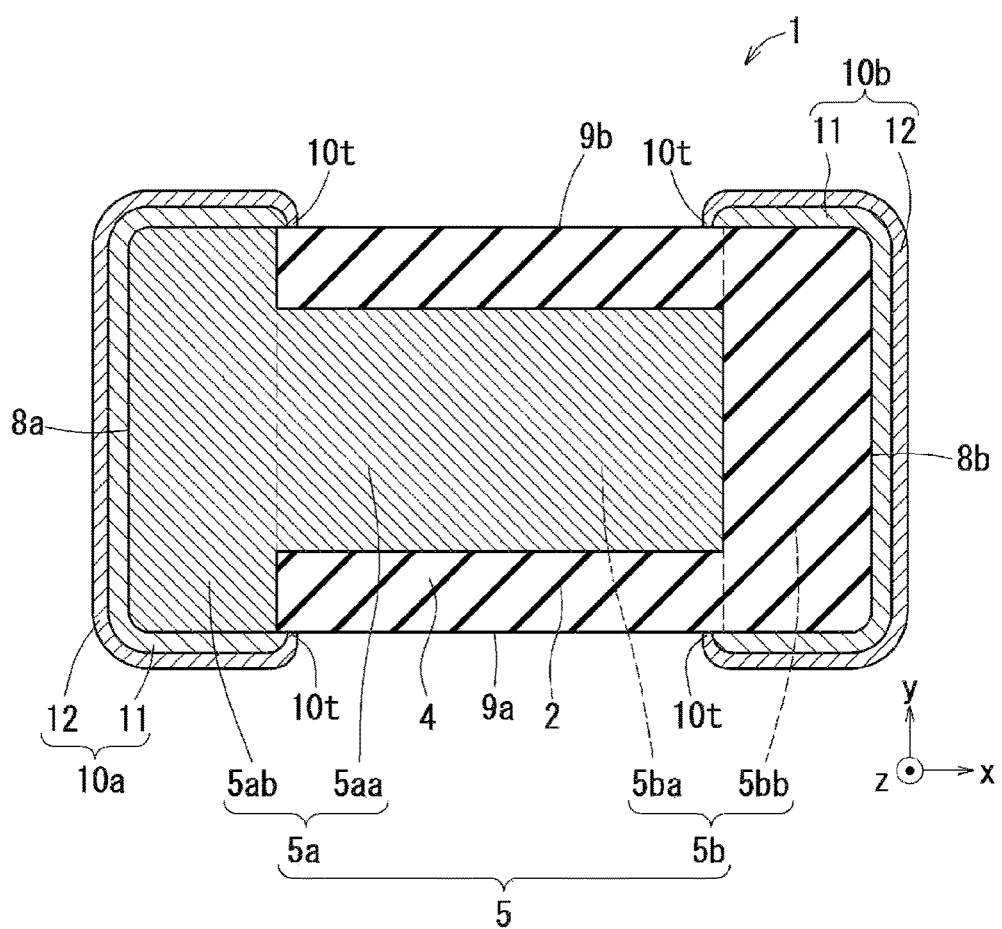
FIG. 4 is a sectional view taken along line IV-IV illustrated in FIG. 3.

FIG. 1 is a perspective view illustrating a multilayer ceramic capacitor according to the present embodiment. FIG. 2 is a perspective view illustrating a laminate of the multilayer ceramic capacitor illustrated in FIG. 1. FIG. 3 is a sectional view taken along line III-III illustrated in FIG. 1. FIG. 4 is a sectional view taken along line IV-IV illustrated in FIG. 3. For ease of understanding of the illustration, portions exposed at a surface of the laminate in internal electrode layers and first to fourth dummy electrodes are hatched in FIG. 2.

In the present embodiment, as illustrated in FIG. 1, a multilayer ceramic capacitor 1 includes a laminate 2, a first external electrode 10$a$, and a second external electrode 10$b$. Hereinafter, the first external electrode 10$a$ and the second external electrode 10$b$ may be collectively described as external electrodes 10$a$ and 10$b$.

As illustrated in FIG. 2, the laminate 2 has a rectangular parallelepiped shape. The laminate 2 includes a first surface 7$a$ and a second surface 7$b$ that face each other, a first end surface 8$a$ and a second end surface 8$b$ that face each other, and a first side surface 9$a$ and a second side surface 9$b$ that face each other. The first end surface 8$a$ and the second end surface 8$b$ may be perpendicular to the first direction (x axis direction). The first side surface 9$a$ and the second side surface 9$b$ may be perpendicular to the second direction (y axis direction). The first surface 7$a$ and the second surface 7$b$ may be perpendicular to the third direction (z axis direction). Hereinafter, the first surface 7$a$ and the second surface 7$b$ may be collectively described as main surfaces 7$a$ and 7$b$, the first end surface 8$a$ and the second end surface 8$b$ may be collectively described as end surfaces 8$a$ and 8$b$, and the first side surface 9$a$ and the second side surface 9$b$ may be collectively described as side surfaces 9$a$ and 9$b$.

The laminate 2 includes an active portion 3, a first covering portion 61, and a second covering portion 62. As illustrated in FIG. 3, the active portion 3 is formed by alternately laminating dielectric layers 4 and internal electrode layers 5. The dielectric layers 4 and the internal electrode layers 5 are laminated in the third direction (z axis direction). The active portion 3 forms electrostatic capacitance. Referring to FIG. 3, a boundary between the active portion 3 and the first covering portion 61 and a boundary between the active portion 3 and the second covering portion 62 are represented by two-dot chain lines. However, actual boundaries are not clearly presented.

The dielectric layers 4 are each formed of a dielectric material. The dielectric layer 4 may be formed of a ceramic material a main ingredient of which is, for example, barium titanate ($BaTiO_3$), calcium titanate ($CaTiO_3$), strontium titanate ($SrTiO_3$), or barium zirconate ($BaZrO_3$). The dielectric layer 4 may have a thickness of, for example, greater than or equal to 0.1 μm and smaller than or equal to 10 μm. Herein, the "main ingredient" refers to an ingredient of the highest content ratio in a material, a member, or the like on which attention is focused.

The internal electrode layers 5 are each formed of a conductive material. The internal electrode layer 5 may be formed of a metal material a main ingredient of which is, for example, a metal such as Ni (nickel), Cu (copper), Sn (tin), Pt (platinum), Pd (palladium), Ag (silver), or Au (gold) or an alloy of these metals. The internal electrode layer 5 may have a thickness of, for example, smaller than or equal to 1.5 μm. In this case, internal defects caused by internal stress during firing of the laminate 2 or application of voltage can be suppressed and the reliability of the multilayer ceramic capacitor 1 can be improved.

The internal electrode layers 5 include first internal electrode layers 5$a$ and second internal electrode layers 5$b$. A polarity of the internal electrode layers 5$a$ and a polarity of the second internal electrode layers 5$b$ are different from each other. The active portion 3 is formed by alternately laminating the first internal electrode layers 5$a$ and the second internal electrode layers 5$b$ with the dielectric layers 4 interposed therebetween.

As illustrated in FIG. 4, the first internal electrode layers 5$a$ each include a capacitance forming portion 5$aa$ and a drawn portion 5$ab$. The drawn portion 5$ab$ is exposed at the first end surface 8$a$ and the side surfaces 9$a$ and 9$b$. In other words, the drawn portion 5$ab$ forms part of the first end surface 8a, part of the side surface 9a, and part of the side surface 9b. As illustrated in FIG. 4, the second internal electrode layers 5b each include a capacitance forming portion 5ba and a drawn portion 5bb. The drawn portion 5bb is exposed at the second end surface 8b and the side surfaces 9a and 9b. In other words, the drawn portion 5bb forms part of the second end surface 8b, part of the side surface 9a, and part of the side surface 9b. The capacitance forming portion 5aa and the capacitance forming portion 5ba overlap each other in plan view (that is, when seen in the third direction).

As illustrated in FIG. 3, the first covering portion 61 and the second covering portion 62 are positioned at respective ends of the active portion 3 in the third direction (z axis direction). Hereinafter, the first covering portion 61 and the second covering portion 62 may be collectively described as covering portions 61 and 62.

The first covering portion 61 includes a first dummy electrode 61a, a second dummy electrode 61b, and a first dielectric portion 61c. The first dummy electrode 61a and the second dummy electrode 61b are positioned at respective ends of the first dielectric portion 61c in the first direction (x axis direction).

As illustrated in FIG. 3, the first dummy electrode 61a is exposed at the first end surface 8a. In other words, the first dummy electrode 61a forms part of the first end surface 8a. In plan view, the shape of the first dummy electrode 61a may be the same as or different from the shape of the drawn portion 5ab of the first internal electrode layer 5a. In the first direction (x axis direction), the length of the first dummy electrode 61a may be greater or smaller than the length of the drawn portion 5ab. As illustrated in FIG. 3, the second dummy electrode 61b is exposed at the second end surface 8b. In other words, the second dummy electrode 61b forms part of the second end surface 8b. In plan view, the shape of the second dummy electrode 61b may be the same as or different from the shape of the drawn portion 5bb of the second internal electrode layer 5b. In the first direction, the length of the second dummy electrode 61b may be greater or smaller than the length of the drawn portion 5bb.

The first dielectric portion 61c is formed of a dielectric material so as to electrically insulate the first dummy electrode 61a and the second dummy electrode 61b from each other. The first dielectric portion 61c may be formed of a ceramic material used to form the dielectric layers 4.

The second covering portion 62 includes a third dummy electrode 62a, a fourth dummy electrode 62b, and a second dielectric portion 62c. The third dummy electrode 62a and the fourth dummy electrode 62b are positioned at respective ends of the second dielectric portion 62c in the first direction (x axis direction). Hereinafter, the first dielectric portion 61c and the second dielectric portion 62c may be collectively described as dielectric portions 61c and 62c.

As illustrated in FIGS. 2 and 3, the third dummy electrode 62a is exposed at the first end surface 8a. In other words, the third dummy electrode 62a forms part of the first end surface 8a. In plan view, the shape of the third dummy electrode 62a may be the same as or different from the shape of the drawn portion 5ab of the first internal electrode layer 5a. In the first direction (x axis direction), the length of the third dummy electrode 62a may be greater or smaller than the length of the drawn portion 5ab. As illustrated in FIG. 3, the fourth dummy electrode 62b is exposed at the second end surface 8b. In other words, the fourth dummy electrode 62b forms part of the second end surface 8b. In plan view, the shape of the fourth dummy electrode 62b may be the same as or different from the shape of the drawn portion 5bb of the second internal electrode layer 5b. In the first direction, the length of the fourth dummy electrode 62b may be greater or smaller than the length of the drawn portion 5bb.

The second dielectric portion 62c is formed of a dielectric material so as to electrically insulate the third dummy electrode 62a and the fourth dummy electrode 62b from each other. The second dielectric portion 62c may be formed of a ceramic material used to form the dielectric layers 4.

Hereinafter, the first dummy electrode 61a, the second dummy electrode 61b, the third dummy electrode 62a, and the fourth dummy electrode 62b may be collectively described as dummy electrodes 61a to 62b.

As illustrated in FIGS. 2 and 3, at least one of the dummy electrodes 61a to 62b has a greater thickness than a thickness of one of the internal electrode layers 5 in the third direction (z axis direction). The thickness of the dummy electrodes 61a to 62b may be greater than or equal to three times, five times, or ten times the thickness of the one of the internal electrode layers 5. The dimensions of the dummy electrodes 61a to 62b may be substantially the same. Hereinafter, unless otherwise specified, all the dummy electrodes 61a to 62b have a greater thickness than the thickness of the internal electrode layers 5 in the third direction as illustrated in FIGS. 2 and 3.

At least one of the dummy electrodes 61a to 62b may be embedded in the covering portions 61 and 62 (dielectric portions 61c and 62c). In this case, at least one of the dummy electrodes 61a to 62b may have its entire thickness embedded in the covering portions 61 and 62, or only a part of it may be embedded. In the former case, at least one of the dummy electrodes 61a to 62b may be flush with the dielectric portions 61c and 62c. From another perspective, The main surfaces 7a and 7b may be configured to be planar.

The first external electrode 10a extends from the first end surface 8a to the first surface 7a, the second surface 7b, the first side surface 9a, and the second side surface 9b. The first external electrode 10a is connected to portions of the drawn portion 5ab exposed at the surface of the laminate 2. The first external electrode 10a may completely cover the exposed portions of the drawn portion 5ab. In this case, the first internal electrode layers 5a and the first external electrode 10a can be electrically connected to each other in a preferred manner, and the active portion 3 can be protected from an external environment (such as moisture). The first external electrode 10a is connected to portions of the first dummy electrode 61a and the third dummy electrode 62a exposed at the surface of the laminate 2. The first external electrode 10a may completely cover the exposed portions of the first dummy electrode 61a and the third dummy electrode 62a. In this case, a contact area between the laminate 2 and the first external electrode 10a can be increased, and accordingly, bonding strength between the laminate 2 and the first external electrode 10a can be improved.

The second external electrode 10b extends from the second end surface 8b to the first surface 7a, the second surface 7b, the first side surface 9a, and the second side surface 9b. The second external electrode 10b is connected to portions of the drawn portion 5bb exposed at the surface of the laminate 2. The second external electrode 10b may completely cover the exposed portions of the drawn portion 5bb. In this case, the second internal electrode layers 5b and the second external electrode 10b can be electrically connected to each other in a preferred manner, and the active portion 3 can be protected from the external environment (such as moisture). The second external electrode 10b is connected to portions of the second dummy electrode 61b and the fourth dummy electrode 62b exposed at the surface of the laminate 2. The second external electrode 10b may completely cover the exposed portions of the second dummy electrode 61b and the fourth dummy electrode 62b. In this case, a contact area between the laminate 2 and the second external electrode 10b can be increased, and accordingly, bonding strength between the laminate 2 and the second external electrode 10b can be improved.

As illustrated in FIGS. 3 and 4, the external electrodes 10a and 10b may each include a first layer 11 in contact with the surface of the laminate 2 and a second layer 12 covering the first layer 11. The first layer 11 is also referred to as an underlying layer. The second layer 12 is also referred to as an external layer. When the external electrodes 10a and 10b have a multilayer structure, bonding strength between the underlying layer 11 and the laminate 2 can be improved and the wettability of a conductive bonding material (for example, solder) with the external layer 12 can be improved. As a result, the reliability of the multilayer ceramic capacitor 1 can be improved, and the reliability of a mounted structure including the multilayer ceramic capacitor 1 can be improved.

The underlying layer 11 may be formed of a metal material a main ingredient of which is, for example, a metal such as Ni, Cu, Sn, Pt, Pd, Ag, or Au or an alloy of these metals. The underlying layer 11 may be formed by using a thin-film formation technique such as plating, sputtering, and vapor deposition. In this case, a volume of the underlying layer 11 can be reduced, and accordingly, the size of the multilayer ceramic capacitor 1 can be reduced and an effective volume contributing to the electrostatic capacitance can be increased. The technique for the formation of the underlying layer 11 is not limited to the thin-film formation technique. The underlying layer 11 may be formed by using a thick-film formation technique such as dipping, screen printing, or gravure printing. As illustrated in FIGS. 3 and 4, the underlying layers 11 may completely cover the exposed portions of the drawn portions 5ab and 5bb and the dummy electrodes 61a to 62b.

The external layer 12 may be formed of a metal material a main ingredient of which is, for example, a metal such as Ni, Cu, Sn, Pt, Pd, Ag, or Au or an alloy of these metals. The external layer 12 may be formed by using a thin-film formation technique such as electroless plating or electrolytic plating. As illustrated in FIGS. 3 and 4, the external layer 12 may completely cover (a surface of) the underlying layer 11. The external layer 12 may extend beyond an end portion of the underlying layer 11 near a center of the laminate 2 toward the center of the laminate 2. In other words, in each of the external electrodes 10a and 10b, an inner end portion 10t near the center of the laminate 2 may be formed only of the external layer 12.

In the present embodiment, in the multilayer ceramic capacitor 1, the dummy electrodes 61a to 62b having a greater thickness than the thickness of the internal electrode layers 5 are exposed at the end surfaces 8a and 8b and the external electrodes 10a and 10b are connected to the exposed portions of the dummy electrodes 61a to 62b. Thus, the bonding strength between the laminate 2 and the external electrodes 10a and 10b can be improved. As a result, the reliability of the multilayer ceramic capacitor 1 can be improved.

In the related-art multilayer ceramic capacitor, a covering portion (corresponding to the covering portions 61 and 62) includes a dummy electrode portion formed by alternately laminating a plurality of dielectric layers and a plurality of dummy electrode layers. In the present embodiment, the number of interfaces between different materials in the covering portions 61 and 62 of the multilayer ceramic capacitor 1 is small compared to the related-art multilayer ceramic capacitor. Thus, the occurrences of interlayer peeling in the covering portions 61 and 62 can be reduced during (barrel) polishing the laminate 2. Thus, the reliability of the multilayer ceramic capacitor 1 can be improved.

Furthermore, in the multilayer ceramic capacitor 1, the area of the exposed portions of the dummy electrodes 61a to 62b in the end surfaces 8a and 8b can be increased without an increase of the number of the interfaces between different materials in the covering portions 61 and 62. Thus, the reliability of the multilayer ceramic capacitor 1 can be effectively improved.

The first dummy electrode 61a and the second dummy electrode 61b may be further exposed at the first surface 7a, and the third dummy electrode 62a and the fourth dummy electrode 62b may be further exposed at the second surface 7b. In other words, the first dummy electrode 61a and the second dummy electrode 61b may form parts of the first surface 7a, and the third dummy electrode 62a and the fourth dummy electrode 62b may form parts of the second surface 7b. The first external electrode 10a extends from the first end surface 8a to the main surfaces 7a and 7b, and the second external electrode 10b extends from the second end surface 8b to the main surfaces 7a and 7b. Thus, when the dummy electrodes 61a to 62b are exposed at the main surfaces 7a and 7b, contact areas between the dummy electrodes 61a to 62b and the external electrodes 10a and 10b can be increased. As a result, the bonding strength between the laminate 2 and the external electrodes 10a and 10b can be improved, and accordingly, the reliability of the multilayer ceramic capacitor 1 can be improved.

Upper surfaces of the first dummy electrode 61a and the second dummy electrode 61b may be flush with an upper surface of the first dielectric portion 61c, and lower surfaces of the third dummy electrode 62a and the fourth dummy electrode 62b may be flush with a lower surface of the second dielectric portion 62c. In this case, in manufacturing steps of the multilayer ceramic capacitor 1, a thickness of the external electrodes 10a and 10b on the main surfaces 7a and 7b can be easily controlled with accuracy. This increases ease of manufacturing the multilayer ceramic capacitor 1 having the dimensions as designed.

The upper surfaces of the first dummy electrode 61a and the second dummy electrode 61b may slightly project upward from the upper surface of the first dielectric portion 61c, and the lower surfaces of the third dummy electrode 62a and the fourth dummy electrode 62b may slightly project downward from the lower surface of the second dielectric portion 62c. In this case, when the external electrodes 10a and 10b are formed so as to turn around at the end portions of the dummy electrodes 61a to 62b near the center of the laminate 2, the contact areas between the laminate 2 and the external electrodes 10a and 10b increase, and accordingly, the laminate 2 and the external electrodes 10a and 10b are unlikely to peel off from each other. As a result, the reliability of the multilayer ceramic capacitor 1 can be improved.

The dummy electrodes 61a to 62b may be further exposed at the first side surface 9a and the second side surface 9b. In other words, the dummy electrodes 61a to 62b may form parts of the first side surface 9a and the second side surface 9b. The first external electrode 10a extends from the first end surface 8a to the side surfaces 9a and 9b, and the second external electrode 10b extends from the second end surface 8b to the side surfaces 9a and 9b. Thus, when the dummy electrodes 61a to 62b are exposed at the side surfaces 9a and 9b, the contact areas between the dummy electrodes 61a to 62b and the external electrodes 10a and 10b can be increased. As a result, the bonding strength between the laminate 2 and the external electrodes 10a and 10b can be improved, and accordingly, the reliability of the multilayer ceramic capacitor 1 can be improved.

Side surfaces of the first dummy electrode 61a and the second dummy electrode 61b may be flush with side surfaces of the first dielectric portion 61c, and side surfaces of the third dummy electrode 62a and the fourth dummy electrode 62b may be flush with side surfaces of the second dielectric portion 62c. In this case, in the manufacturing steps of the multilayer ceramic capacitor 1, the thickness of the external electrodes 10a and 10b on the side surfaces 9a and 9b can be easily controlled with accuracy. This increases ease of manufacturing the multilayer ceramic capacitor 1 having the dimensions as designed.

The side surfaces of the first dummy electrode 61a and the second dummy electrode 61b may slightly project in the second direction (y axis direction) from the side surfaces of the first dielectric portion 61c, and the side surfaces of the third dummy electrode 62a and the fourth dummy electrode 62b may slightly project in the second direction from the side surfaces of the second dielectric portion 62c. In other words, the side surfaces of the first dielectric portion 61c may be recessed from the side surfaces of the first dummy electrode 61a and the second dummy electrode 61b, and the side surfaces of the second dielectric portion 62c may be recessed from the side surfaces of the third dummy electrode 62a and the fourth dummy electrode 62b. In this case, when the external electrodes 10a and 10b are formed so as to turn around at the end portions of the dummy electrodes 61a to 62b near the center of the laminate 2, the contact areas between the laminate 2 and the external electrodes 10a and 10b increase, and accordingly, the laminate 2 and the external electrodes 10a and 10b are unlikely to peel off from each other. As a result, the reliability of the multilayer ceramic capacitor 1 can be improved.

Figure 5:
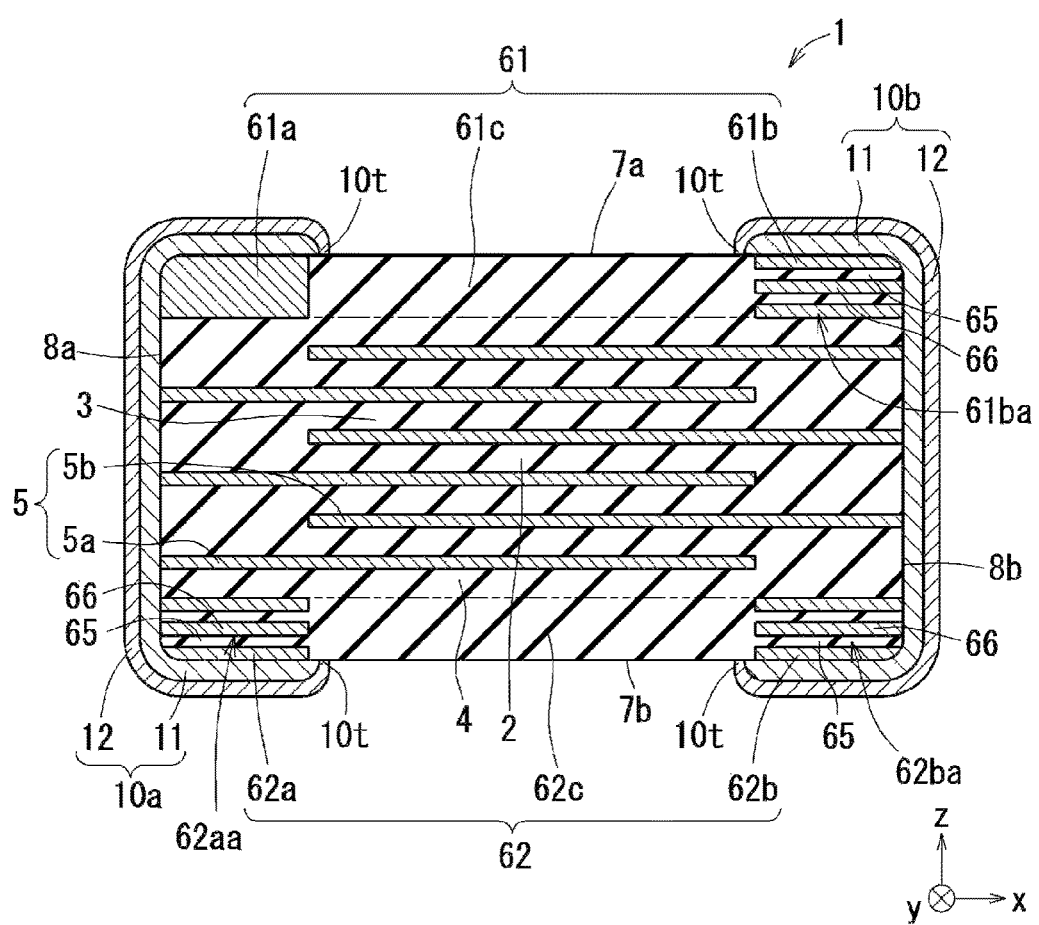
FIG. 5 is a sectional view illustrating the multilayer ceramic capacitor according to the present embodiment.

In the multilayer ceramic capacitor 1 according to the present embodiment, it is sufficient that at least one of the dummy electrodes 61a to 62b have a greater thickness than the thickness of the internal electrode layers 5. The multilayer ceramic capacitor 1 may be structured such that, as illustrated in FIG. 5, the first dummy electrode 61a has a greater thickness than the thickness of the internal electrode layers 5, and the second dummy electrode 61b, the third dummy electrode 62a, and the fourth dummy electrode 62b have a thickness smaller than or equal to the thickness of the internal electrode layers 5. The number of interfaces between different materials in the covering portions 61 and 62 of the multilayer ceramic capacitor 1 can be reduced compared to the related-art multilayer ceramic capacitor. Thus, the occurrences of interlayer peeling in the covering portions 61 and 62 can be reduced during barrel polishing the laminate 2. Thus, the reliability of the multilayer ceramic capacitor 1 can be improved.

The laminate 2 may include an auxiliary electrode portion 61ba. The auxiliary electrode portion 61ba is positioned inside (on a lower side of) the second dummy electrode 61b in the third direction (z axis direction) and formed by alternately laminating a dielectric layer 65 and an electrode layer 66. In this case, the first dummy electrode 61a and the second dummy electrode 61b can be provided without forming a step in the first surface 7a of the laminate 2. The electrode layer 66 may be exposed at the second end surface 8b and the side surfaces 9a and 9b. In this case, bonding strength between the laminate 2 and the second external electrode 10b can be improved. In plan view, the shape of the electrode layer 66 may be the same as or different from the shape of the second dummy electrode 61b.

The laminate 2 may include an auxiliary electrode portion 62aa and an auxiliary electrode portion 62ba. The auxiliary electrode portion 62aa is positioned inside (on an upper side of) the third dummy electrode 62a in the third direction (z axis direction), and the auxiliary electrode portion 62ba is positioned inside (on an upper side of) the fourth dummy electrode 62b in the third direction. As is the case with the auxiliary electrode portion 61ba, the auxiliary electrode portions 62aa and 62ba may be formed by alternately laminating the dielectric layers 65 and the internal electrode layers 66. The electrode layer 66 of the auxiliary electrode portion 62aa may be exposed at the first end surface 8a and the side surfaces 9a and 9b. The electrode layer 66 of the auxiliary electrode portion 62ba may be exposed at the second end surface 8b and the side surfaces 9a and 9b. In this case, bonding strength between the laminate 2 and the external electrodes 10a and 10b can be improved. In plan view, the shape of the electrode layer 66 of the auxiliary electrode portion 62aa may be the same as or different from the shape of the third dummy electrode 62a. In plan view, the shape of the electrode layer 66 of the auxiliary electrode portion 62ba may be the same as or different from the shape of the fourth dummy electrode 62b.

The multilayer ceramic capacitor 1 may be structured such that two or three dummy electrodes out of the dummy electrodes 61a to 62b have a greater thickness than the thickness of the internal electrode layers 5.

In FIG. 5, the first dummy electrode 61a and the third dummy electrode 62a can be regarded as being configured asymmetrically (i.e., not line-symmetrically) with respect to the active region 3. Specifically, a volume of the first dummy electrode 61a is made greater than a volume of the third dummy electrode 62a. The thickness of the first dummy electrode 61a is made greater than that of the third dummy electrode 62a.

Figure 6:
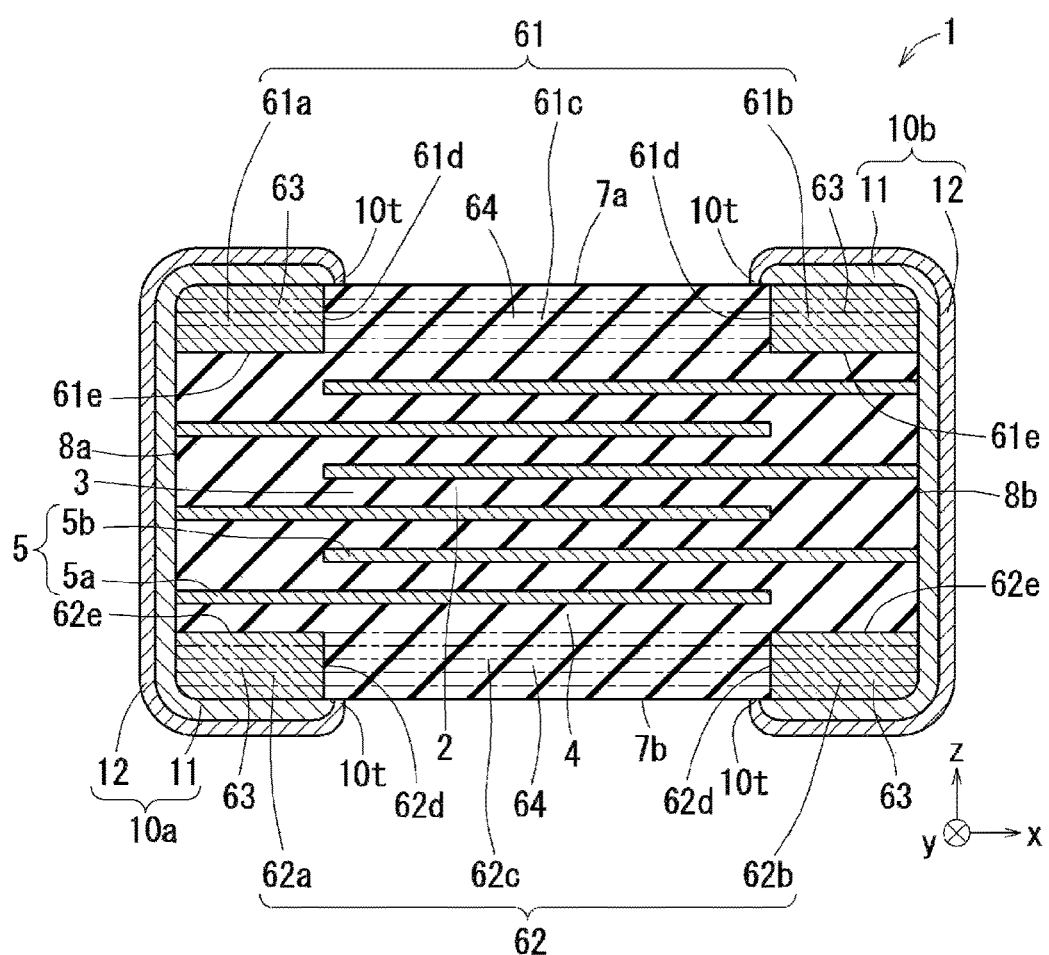
FIG. 6 is a sectional view illustrating another example of the multilayer ceramic capacitor according to the present embodiment.
Figure 7:
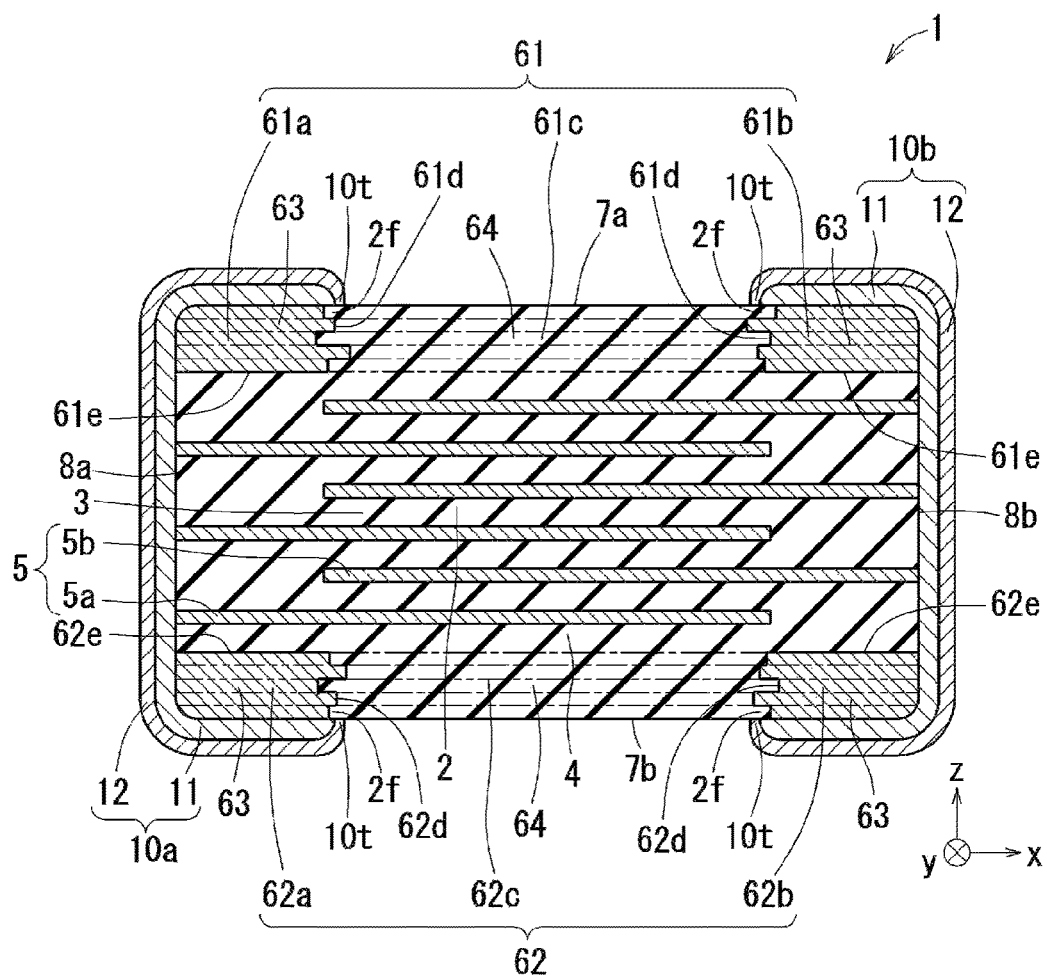
FIG. 7 is a sectional view illustrating another example of the multilayer ceramic capacitor according to the present embodiment.
Figure 8:
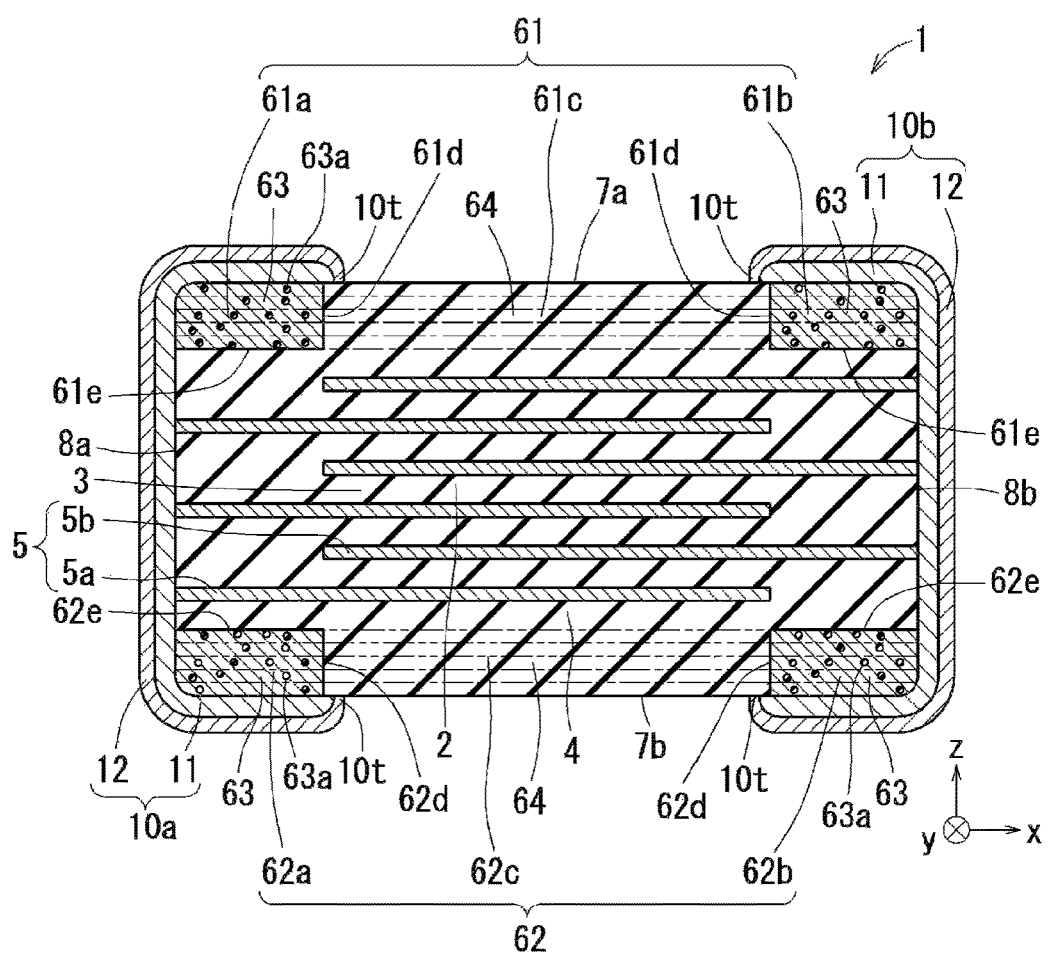
FIG. 8 is a sectional view illustrating another example of the multilayer ceramic capacitor according to the present embodiment.

Other examples of the multilayer ceramic capacitor are described below according to the present embodiment. FIGS. 6 to 8 are sectional views illustrating the other examples of the multilayer ceramic capacitor according to the present embodiment. The sectional views illustrated in FIGS. 6 to 8 correspond to the sectional view illustrated in FIG. 3.

As illustrated in FIG. 6, the dummy electrodes 61a to 62b may each include a plurality of dummy electrode layers 63. The plurality dummy electrode layers 63 are laminated in the third direction (z axis direction). In this case, the dummy electrodes 61a to 62b having a great thickness can be formed by laminating the dummy electrode layers 63 having a small thickness. When the thickness of the dummy electrode layers 63 is small, the dimensions of the dummy electrode layers 63 can be controlled with high accuracy. Thus, compared to the case where the dummy electrodes 61a to 62b are each formed as a single layer, the dimensions of the dummy electrodes 61a to 62b can be controlled with high accuracy. As a result, even when the size of the multilayer ceramic capacitor 1 is small, the dummy electrodes 61a to 62b having the dimensions as designed can be formed, and the reliability of the multilayer ceramic capacitor 1 can be improved. Referring to FIG. 6, boundaries between the dummy electrode layers 63 are represented by two-dot chain lines. However, actual boundaries are not clearly presented. This is also true for FIGS. 7 and 8.

The thickness of the dummy electrode layers 63 may be substantially the same as the thickness of the internal electrode layers 5. Although the details will be described later, in the manufacturing steps of the multilayer ceramic capacitor 1, the active portion 3 of the unfired laminate 2 is created with ceramic slurry and conductive paste through a printing method such as the screen printing or gravure printing. Thus, when the thickness of the dummy electrode layers 63 and the thickness of the internal electrode layers 5 are substantially the same, the dummy electrode layers 63 can be printed through a printing method that is the same as or similar to the printing method used for printing the internal electrode layers 5. As a result, the dummy electrodes 61a to 62b having the dimensions as designed can be efficiently formed.

When the dummy electrodes 61a to 62b include the plurality of dummy electrode layers 63 that are laminated, the first dielectric portion 61c and the second dielectric portion 62c may include a plurality of dielectric layers 64 that are laminated. The thickness of the dielectric layers 64 may be substantially the same as the thickness of the dummy electrode layers 63. In this case, the dielectric layers 64 can be printed through a printing method that is the same as or similar to the printing method used for printing the dummy electrode layers 63. As a result, the covering portions 61 and 62 having the dimensions as designed can be efficiently formed. Referring to FIG. 6, boundaries between the dielectric layers 64 are represented by two-dot chain lines. However, actual boundaries are not clearly presented. This is also true for FIGS. 7 and 8.

The dummy electrode layers 63 may include a ceramic-material 63a consisting of a dielectric material. In this case, bonding strength between the dummy electrode layers 63 can be improved, and accordingly, the occurrences of interlayer peeling in the dummy electrodes 61a to 62b can be suppressed. The dummy electrode layers 63 may include a ceramic-material consisting of a ceramic material included in the dielectric layers 4 and the dielectric layers 64. In this case, bonding strength between the dummy electrode layers 63 can be improved and bonding strength between the dummy electrodes 61a to 62b and the active portion 3 can be improved. Furthermore, bonding strength between the first and second dummy electrodes 61a and 61b and the first dielectric portion 61c can be improved, and bonding strength between the third and fourth dummy electrodes 62a and 62b and the first dielectric portion 61c can be improved. As a result, the occurrences of peeling in the laminate 2 can be suppressed, and accordingly, the reliability of the multilayer ceramic capacitor 1 can be improved.

In the illustrated example, the internal electrode layers 5 do not contain ceramic material. Therefore, it can be said that the dummy electrode layer 63 contains more ceramic material than the internal electrode layer 5. However, the internal electrode layer 5 may also contain ceramic material, and the ceramic material in the dummy electrode layer 63 may be greater than that in the internal electrode layer 5. In this case, for example, in a cross-section as shown in the figure, the area of ceramic material per unit area and/or the number of ceramic particles per unit area may be compared. This allows for determining whether the ceramic material in the dummy electrode layer 63 is greater than that in the internal electrode layer 5.

An interface 61d between the first dielectric portion 61c and at least one of the first dummy electrode 61a or the second dummy electrode 61b may include an uneven structure. For example, the multilayer ceramic capacitor 1 is to be solder mounted (reflow solder mounted) on an external substrate in use. When the multilayer ceramic capacitor 1 is mounted on the external substrate, cracking is likely to occur in regions 2f near the inner end portions 10t (hereinafter, also referred to as "facing regions") of the external electrodes 10a and 10b in (the first surface 7a of) the laminate 2 due to contraction of the external electrodes 10a and 10b during cooling at low temperature after temperature rise. With the uneven structure at the interface 61d of the first covering portion 61, even when the cracking occurs from the facing regions 2f in the first covering portion 61, extension of the cracking to the active portion 3 can be suppressed. As a result, moisture resistance of the multilayer ceramic capacitor 1 can be improved, and accordingly, the reliability can be improved.

When the first dummy electrode 61a and the second dummy electrode 61b each consist of the plurality of dummy electrode layers 63, the uneven structures of the interfaces 61d may be formed by regularly or irregularly varying the positions of end portions of the plurality of dummy electrode layers 63 on the first dielectric portion 61c side in the first direction (x axis direction) as illustrated in FIG. 7. When the first dummy electrode 61a and the second dummy electrode 61b are each formed as a single layer, the uneven structures of the interfaces 61d may be formed by, for example, providing uneven structures at interfaces between an electrode pattern which is to become the first dummy electrode 61a and the second dummy electrode 61b and an electrode pattern which is to become first dielectric portion 61c in creation steps of a mother laminate (see FIGS. 9 and 12).

An interface 62d between the second dielectric portion 62c and at least one of the third dummy electrode 62a or the fourth dummy electrode 62b may include an uneven structure. The effect of the uneven structure of the interface 62d is the same as or similar to the effect of the uneven structure of the interface 61d, and a method for providing the uneven structure at the interface 62d is the same as or similar to the method for providing the uneven structure at the interface 61d. Thus, detailed description is omitted.

As illustrated in FIGS. 3 and 6 to 8, lower surfaces of the first dummy electrode 61a and the second dummy electrode 61b may be in contact with an upper surface of the active portion 3. In the laminate 2, interfaces 61e between the active portion 3 and the first dummy electrode 61a and between the active portion 3 and the second dummy electrode 61b may include uneven structures. In this case, peeling between the active portion 3 and the first dummy electrode 61a and the peeling between the active portion 3 and the second dummy electrode 61b are unlikely to occur. As a result, the reliability of the multilayer ceramic capacitor 1 can be improved.

The lower surface of the first dummy electrode 61a or the lower surface of the second dummy electrode 61b is not necessarily in contact with the upper surface of the active portion 3. The first covering portion 61 may include intervening layers (not illustrated) positioned between the active portion 3 and the first dummy electrode 61a and between the active portion 3 and the second dummy electrode 61b. The intervening layers may be formed of a dielectric material used to form the first dielectric portion 61c. In the first covering portion 61, interfaces between the intervening layer and the first dummy electrode 61a and between the intervening layer and the second dummy electrode 61b may include uneven structures. In this case, the occurrences of peeling in the first covering portion 61 can be suppressed, and accordingly, the reliability of the multilayer ceramic capacitor 1 can be improved.

Upper surfaces of the third dummy electrode 62a and the fourth dummy electrode 62b may be in contact with a lower surface of the active portion 3. In the laminate 2, interfaces 62e between the active portion 3 and the third dummy electrode 62a and between the active portion 3 and the fourth dummy electrode 62b may include uneven structures. In this case, peeling between the active portion 3 and the third dummy electrode 62a and the peeling between the active portion 3 and the fourth dummy electrode 62b are unlikely to occur. As a result, the reliability of the multilayer ceramic capacitor 1 can be improved.

An upper surface of the third dummy electrode 62a or an upper surface of the fourth dummy electrode 62b is not necessarily in contact with a lower surface of the active portion 3. The second covering portion 62 may include second intervening layers (not illustrated) positioned between the active portion 3 and the third dummy electrode 62a and between the active portion 3 and the fourth dummy electrode 62b. The second intervening layers may be formed of a dielectric material used to form the second dielectric portion 62c. In the second covering portion 62, interfaces between the second intervening layer and the third dummy electrode 62a and between the second intervening layer and the fourth dummy electrode 62b may include uneven structures. In this case, the occurrences of peeling in the second covering portion 62 can be suppressed, and accordingly, the reliability of the multilayer ceramic capacitor 1 can be improved.

Figure 9:
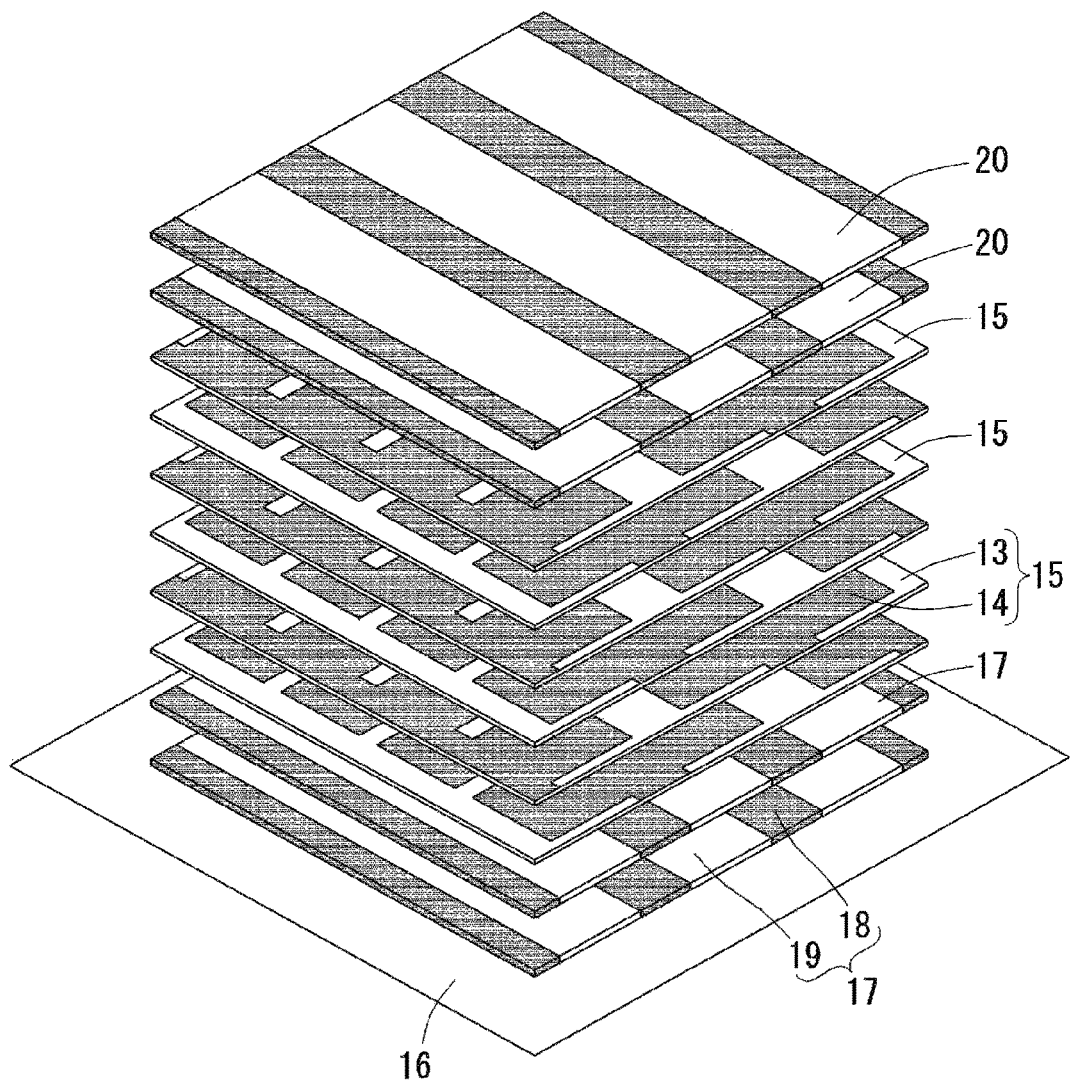
FIG. 9 is a perspective view illustrating examples of creating steps of a mother laminate.
Figure 10:
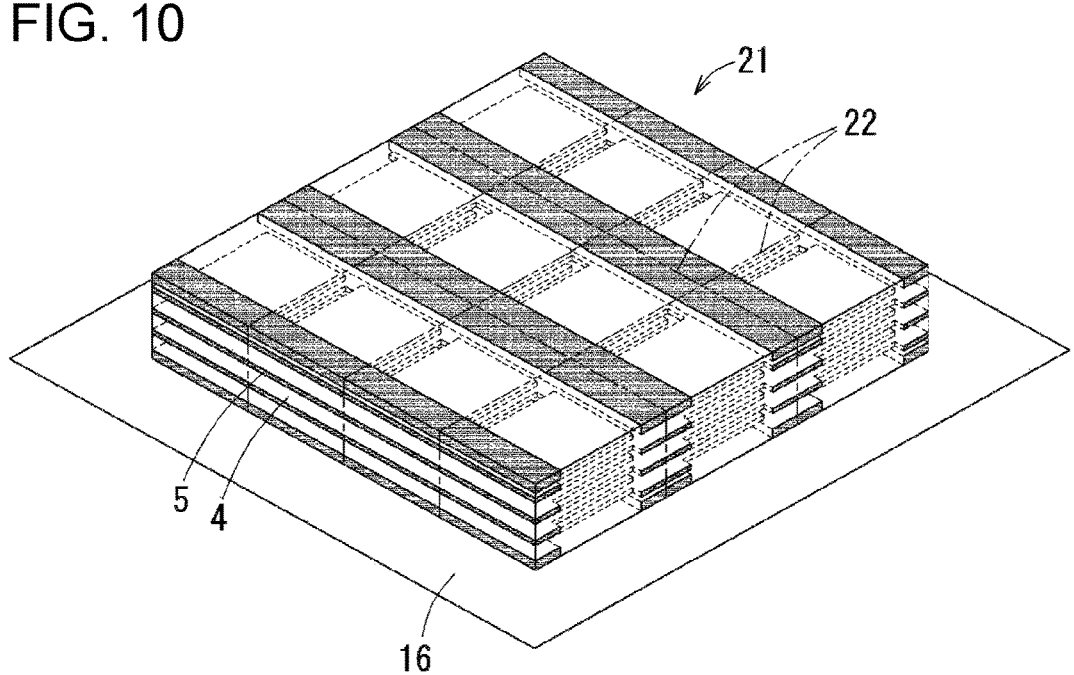
FIG. 10 is a perspective view illustrating an example of the mother laminate.
Figure 11:
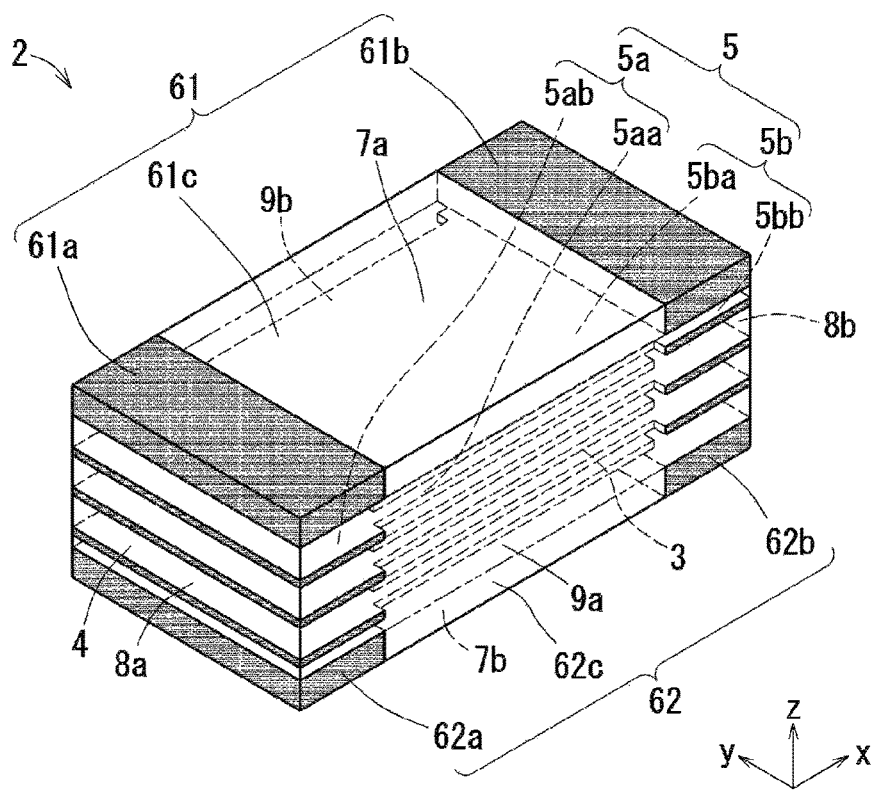
FIG. 11 is a perspective view illustrating an example of the laminate obtained by cutting the mother laminate.

An example of a manufacturing method of the multilayer ceramic capacitor 1 (hereinafter, also referred to as a "first manufacturing method") is described below. FIG. 9 is a perspective view illustrating examples of creating steps of the mother laminate. FIG. 10 is a perspective view illustrating an example of the mother laminate. FIG. 11 is a perspective view illustrating an example of the laminate obtained by cutting the mother laminate.

First, as the material of the dielectric layers 4, raw material powder is prepared. The main ingredient of the raw material powder is a dielectric material such as $BaTiO_3$, $CaTiO_3$, $SrTiO_3$, or $BaZrO_3$ or a mixture of these materials. Then, the prepared raw material powder is mixed with an organic vehicle to prepare ceramic slurry. The organic vehicle used to prepare the ceramic slurry may be, for example, obtained by dissolving resin such as butyral-based resin in a solvent which is a mixture of ethyl alcohol and toluene. Then, ceramic green sheets (hereinafter, also referred to as "green sheets") 13 which are to become the dielectric layers 4 are shaped with the prepared ceramic slurry through a sheet shaping method such as a doctor blade method or a die coater method. An average thickness of the green sheets 13 may be, for example, from about 0.5 to about 10 μm. The above-described ceramic slurry may be used for the dielectric portions 61c and 62c.

Then, as the material of the internal electrode layers 5, powder the main ingredient of which is, for example, a metal such as Ni, Cu, Sn, Pt, Pd, Ag, or Au or an alloy of these metals is mixed with an organic vehicle to prepare conductive paste. The organic vehicle used to prepare the conductive paste may be, for example, obtained by dissolving resin such as ethyl cellulose in a solvent which is a mixture of dihydroterpineol-based solvent and butyl cellosolve. A dispersant may be, for example, oleic acid or polyethylene glycol. The above-described conductive paste may be used for the dummy electrodes 61a to 62b.

Then, a pattern sheet 15 is shaped by printing an electrode pattern 14 which is to become the internal electrode layer 5 on a main surface of each green sheet 13 with the conductive paste (see FIG. 9). The electrode pattern 14 can be printed through a printing method such as a screen printing or gravure printing.

Then, a preliminary laminate being a precursor of the mother laminate is created. First, with the ceramic slurry and the conductive paste, a first cover sheet 17 which is to become the covering portions 61 and 62 is shaped on a supporting sheet 16 through a printing method such as screen printing or gravure printing. The first cover sheet 17 includes an electrode pattern 18 which is to become the dummy electrodes 61a to 62b and a dielectric pattern 19 which is to become the dielectric portions 61c and 62c. The first cover sheet 17 may be shaped through a plurality of times of printing or a single time of printing. Referring to FIG. 9, the first cover sheet 17 is shaped through a plurality of times of printing, that is, the dummy electrodes 61a to 62b include the plurality of dummy electrode layers 63 that are laminated, and the dielectric portions 61c and 62c include the plurality of dielectric layers 64 that are laminated. Electrode patterns 14 and electrode patterns 18 are hatched in FIG. 9.

Then, as illustrated in FIG. 9, a predetermined number of pattern sheets 15 are laminated on the first cover sheet 17, and a second cover sheet 20 is formed on the laminated pattern sheets 15. Thus, the preliminary laminate is created. The second cover sheet 20 can be formed in a manner that is the same as or similar to the manner in forming the first cover sheet 17. Then, when pressure is applied to the preliminary laminate in the laminating direction, a mother laminate 21 as illustrated in FIG. 10 is obtained. Portions of the electrode patterns 14 and the electrode patterns 18 exposed at a surface of the mother laminate 21 are hatched in FIG. 10. The pressure can be applied to the preliminary laminate with, for example, a hydrostatic press device. Then, when the mother laminate 21 is cut along virtual division lines 22, a plurality of unfired laminates 2 as illustrated in FIG. 11 are created. The mother laminate 21 can be cut with a shearing machine, a dicing saw, or the like. The structure of each of the unfired laminates 2 is the same as or similar to the structure of the fired laminate 2. Thus, hereinafter, also for the unfired laminate 2, the terms and reference numerals such as the internal electrode layer 5, the main surfaces 7a and 7b, the end surfaces 8a and 8b, and the side surfaces 9a and 9b are used. Portions of the internal electrode layers 5 and the dummy electrodes 61a to 62b exposed at the surface of the laminate 2 are hatched in FIG. 11.

Then, a degreasing process is performed on the unfired laminate 2 in the air atmosphere, an inactive gas atmosphere, or a reducing atmosphere. The degreasing process may be performed under an atmospheric pressure or a reduced pressure.

Then, the laminate 2 having undergone the degreasing process is fired under a reducing atmosphere. The atmospheric gas may be, for example, a mixed gas of hydrogen (H2) and nitrogen (N2). The firing temperature may be, for example, about 1100 to 1300° C. A reoxidation process may be performed under an oxidation atmosphere on the fired laminate 2.

Then, a barrel polishing process is performed on the fired laminate 2 so as to sufficiently expose the internal electrode layers 5 at the end surfaces 8a and 8b and the side surfaces 9a and 9b and deburr the surface of the laminate 2. Thus, the laminate 2 as illustrated in FIG. 2 is obtained. When the external electrodes 10a and 10b are formed on the obtained laminate 2, the multilayer ceramic capacitor 1 can be manufactured. The external electrodes 10a and 10b may be formed by applying the conductive paste which is to become the external electrodes 10a and 10b to the unfired laminate 2 and simultaneously firing the laminate 2 and the external electrodes 10a and 10b.

Figure 12:
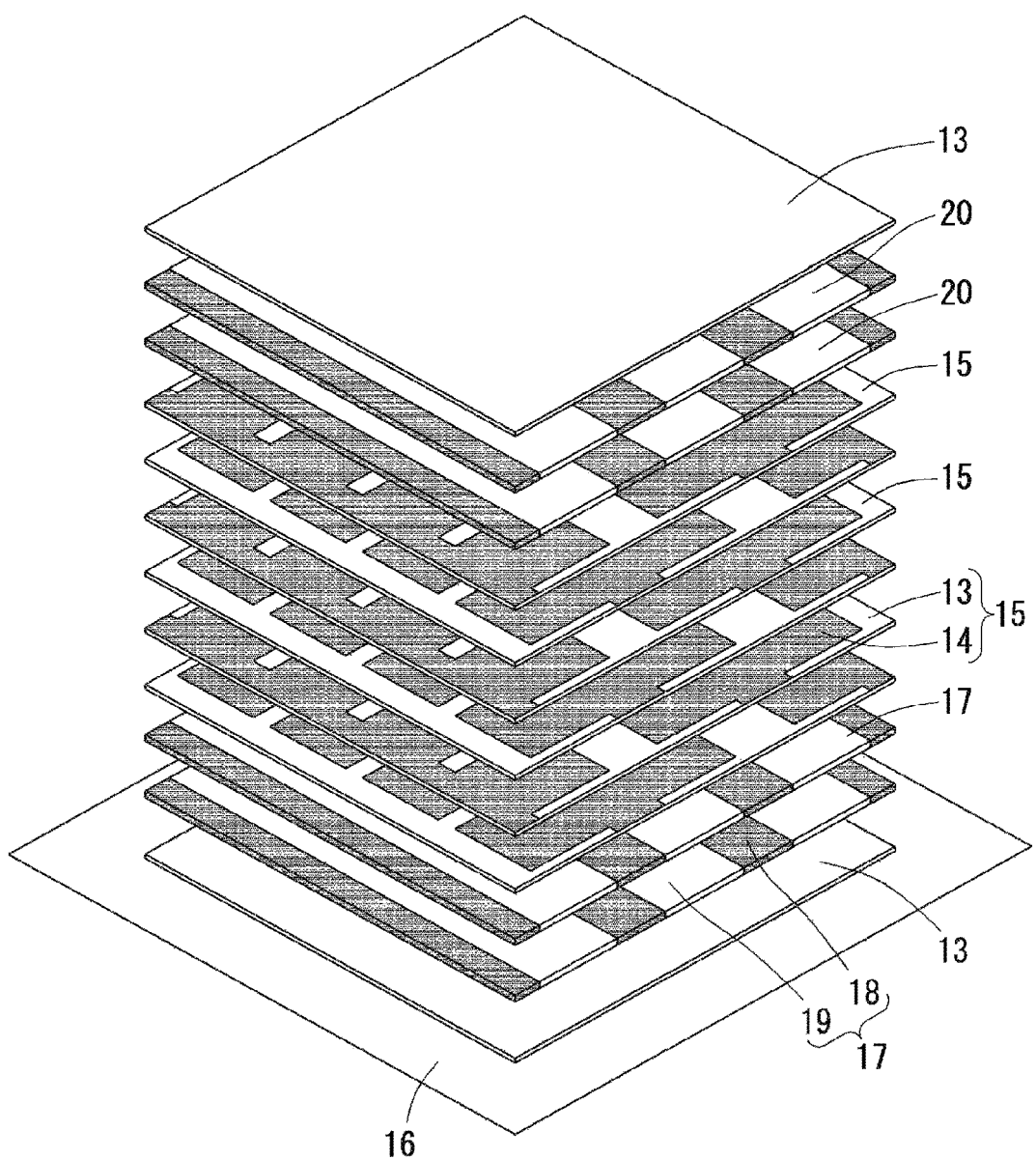
FIG. 12 is a perspective view illustrating other examples of the creating steps of the mother laminate.
Figure 13:
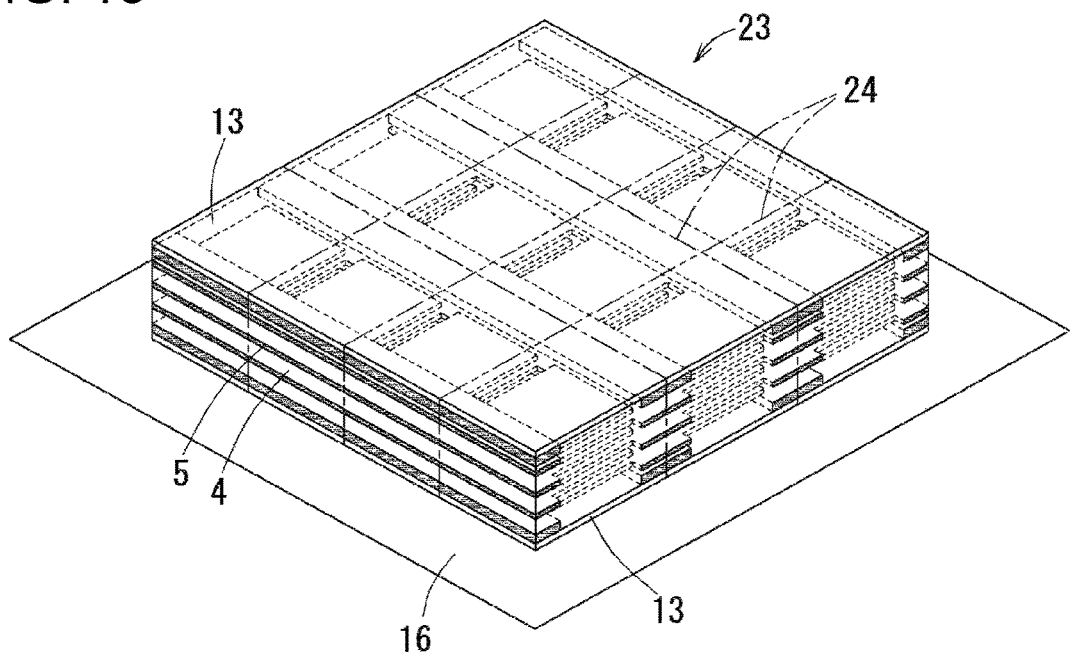
FIG. 13 is a perspective view illustrating another example of the mother laminate.
Figure 14:
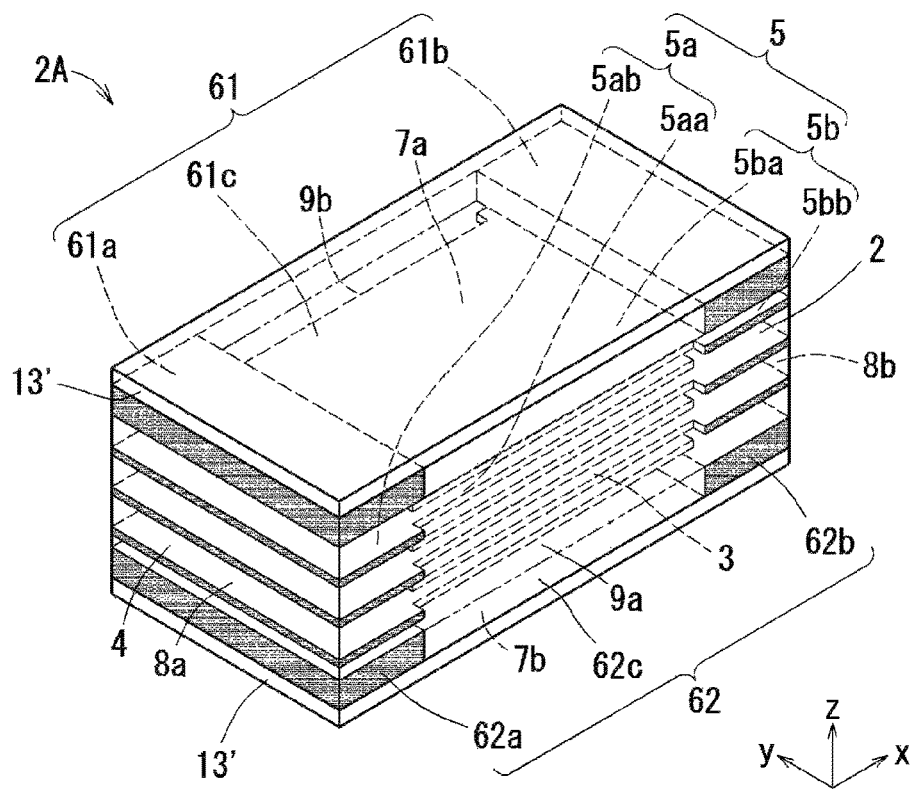
FIG. 14 is a perspective view illustrating another example of the laminate obtained by cutting the mother laminate.

Another example of the manufacturing method of the multilayer ceramic capacitor 1 (hereinafter, also referred to as a "second manufacturing method") is described below. Unlike the first manufacturing method, the green sheets 13 are disposed at the uppermost and the lowermost layers of the mother laminate in the second manufacturing method. Other than this, the second manufacturing method is the same as or similar to the first manufacturing method. Thus, detailed description of the steps which are the same as or similar to those of the first manufacturing method is omitted. FIG. 12 is a perspective view illustrating other examples of the creating steps of the mother laminate. FIG. 13 is a perspective view illustrating another example of the mother laminate. FIG. 14 is a perspective view illustrating another example of the laminate obtained by cutting the mother laminate. The electrode patterns 14 and the electrode patterns 18 are hatched in FIG. 12. Portions of the electrode patterns 14 and the electrode patterns 18 exposed at a surface of the mother laminate are hatched in FIG. 13. Portions of the internal electrode layers 5 and the dummy electrodes 61*a* to 62*b* exposed at the surface of the laminate are hatched in FIG. 14.

According to the second manufacturing method, as illustrated in FIG. 12, a single green sheet 13 is disposed on the supporting sheet 16, and the first cover sheet 17 is formed on the disposed green sheet 13. Furthermore, a predetermined number of the pattern sheets 15 are laminated on the first cover sheet 17, the second cover sheet 20 is formed on the laminated pattern sheets 15, and a single green sheet 13 is disposed on the second cover sheet 20. Thus, the preliminary laminate is created. The second cover sheet 20 can be formed in a manner that is the same as or similar to the manner in forming the first cover sheet 17. When pressure is applied to the preliminary laminate in the laminating direction, a mother laminate 23 as illustrated in FIG. 13 is obtained. The structure of the mother laminate 23 is the same as or similar to that of the mother laminate 21 except for that, compared to the above-described mother laminate 21, the green sheets 13 are positioned at the uppermost layer and the lowermost layer in the laminating direction. Then, when the mother laminate 23 is cut along virtual division lines 24, a plurality of unfired laminates 2A as illustrated in FIG. 14 are created. The structure of each laminate 2A is the same as or similar to that of the laminate 2 except for that, compared to the above-described laminate 2, portions of the green sheets 13 (denoted by a reference numeral 13' in FIG. 14) are positioned at the uppermost layer and the lowermost layer in the laminating direction. In other words, the laminate 2A includes the laminate 2 and the portions of the green sheets 13.

Then, the degreasing process is performed on the unfired laminate 2A. The degreasing process may be the same as or similar to the degreasing process in the first manufacturing method. Then, the laminate 2A having undergone the degreasing process is fired. The firing atmosphere and the firing temperature may be the same as or similar to the firing atmosphere and the firing temperature in the first manufacturing method.

Then, the barrel polishing process is performed on the fired laminate 2A and dielectric layers formed by firing the portions of the green sheets 13 are removed so as to sufficiently expose the internal electrode layers 5 and the dummy electrodes 61*a* to 62*b* at the surface of the laminate 2 and deburr the surface of the laminate 2. Thus, the laminate 2 as illustrated in FIG. 2 is obtained. When the external electrodes 10*a* and 10*b* are formed on the obtained laminate 2, the multilayer ceramic capacitor 1 can be manufactured.

According to the second manufacturing method, the electrode pattern 18 which is to become the dummy electrodes 61*a* to 62*b* is not in direct contact with the supporting sheet 16 but in contact with the supporting sheet 16 with the green sheet 13 interposed therebetween. This can suppress remaining of part of the electrode pattern 18 in the supporting sheet 16 (hereinafter, also referred to as "electrode erosion") during peeling of the laminate 2A, from the supporting sheet 16, obtained by cutting the mother laminate 23. As a result, defective formation of the dummy electrodes 61*a* to 62*b* due to the electrode erosion can be suppressed, and accordingly, the reliability of the multilayer ceramic capacitor 1 can be improved.

For suppressing the electrode erosion caused by the supporting sheet 16, the green sheet 13 is not necessarily disposed on the second cover sheet 20. However, when the green sheet 13 is disposed on the second cover sheet 20, the unfired laminate 2A has a structure that is substantially horizontal symmetry. Thus, when barrel polishing is performed on the fired laminate 2A, an upper portion and a lower portion of the laminate 2A are uniformly polished, and the laminate 2A after the barrel polishing (that is, the laminate 2 illustrated in FIG. 2) has the structure that is substantially horizontal symmetry. This can suppress imbalance of the bonding strength between the laminate 2 and the external electrodes 10*a* and 10*b*, and accordingly, the reliability of the multilayer ceramic capacitor 1 can be improved.

Hereinafter, a multilayer ceramic capacitor is described according to another embodiment of the present disclosure.

Figure 15:
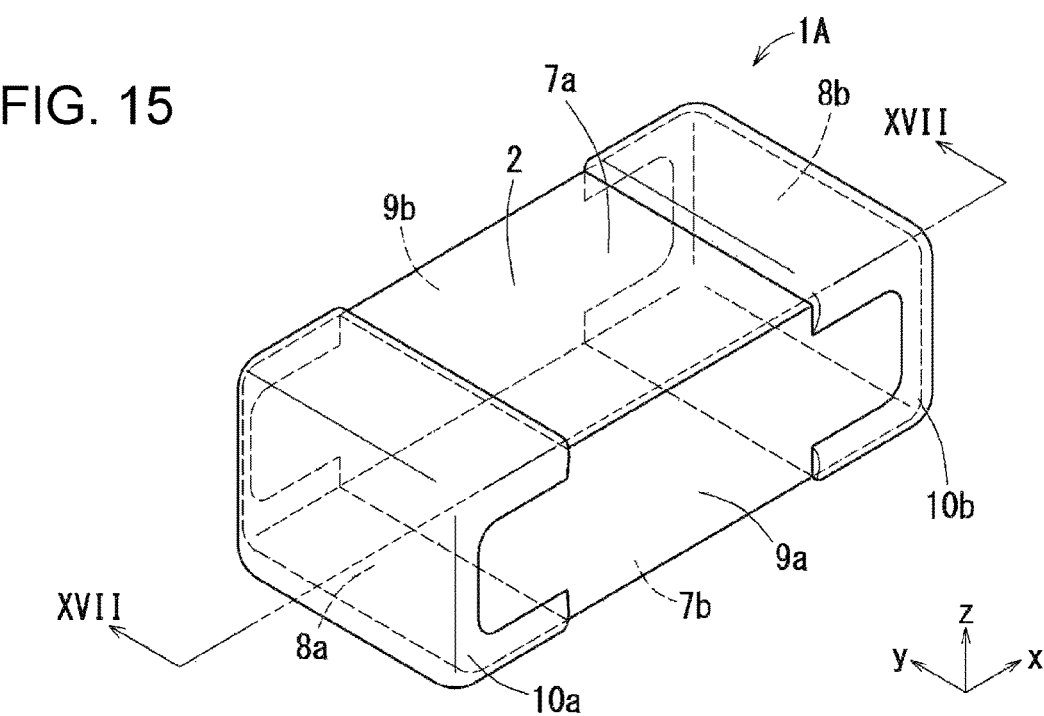
FIG. 15 is a perspective view illustrating a multilayer ceramic capacitor according to another embodiment.
Figure 16:
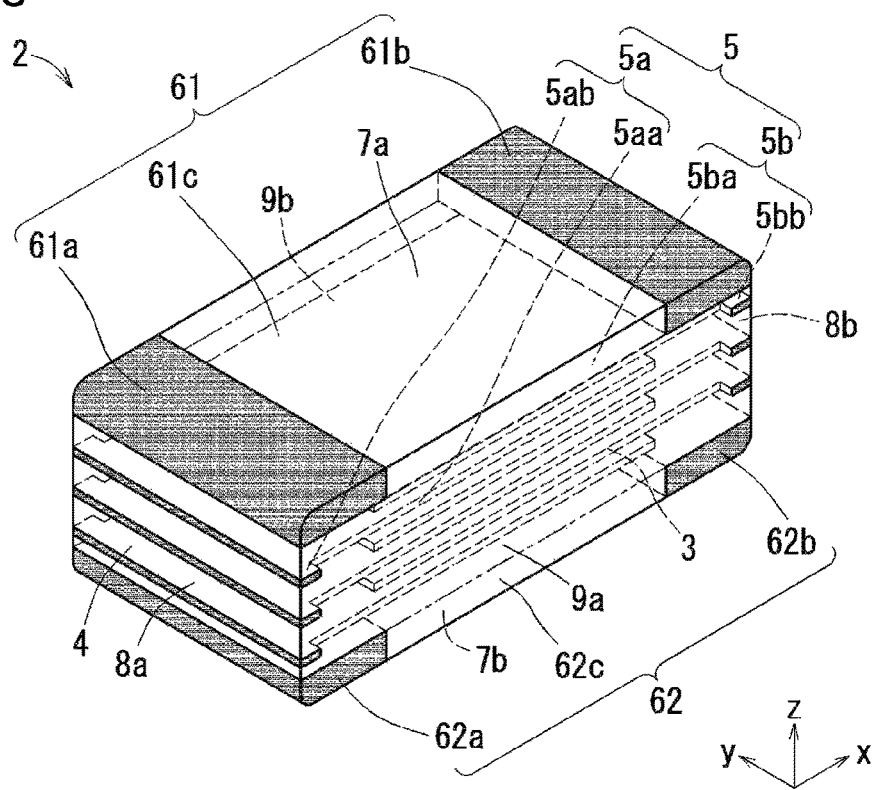
FIG. 16 is a perspective view illustrating a laminate of the multilayer ceramic capacitor illustrated in FIG. 15.
Figure 17:
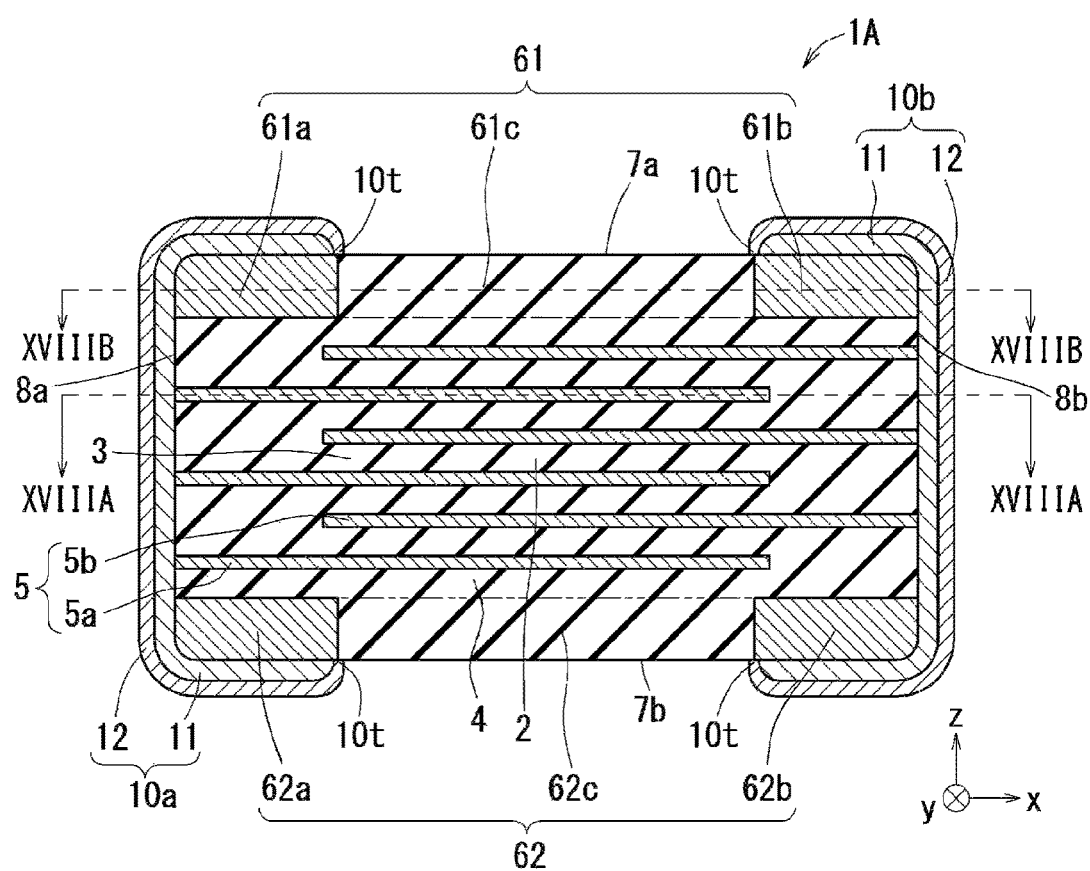
FIG. 17 is a sectional view taken along line XVII-XVII illustrated in FIG. 15.
Figure 18A:
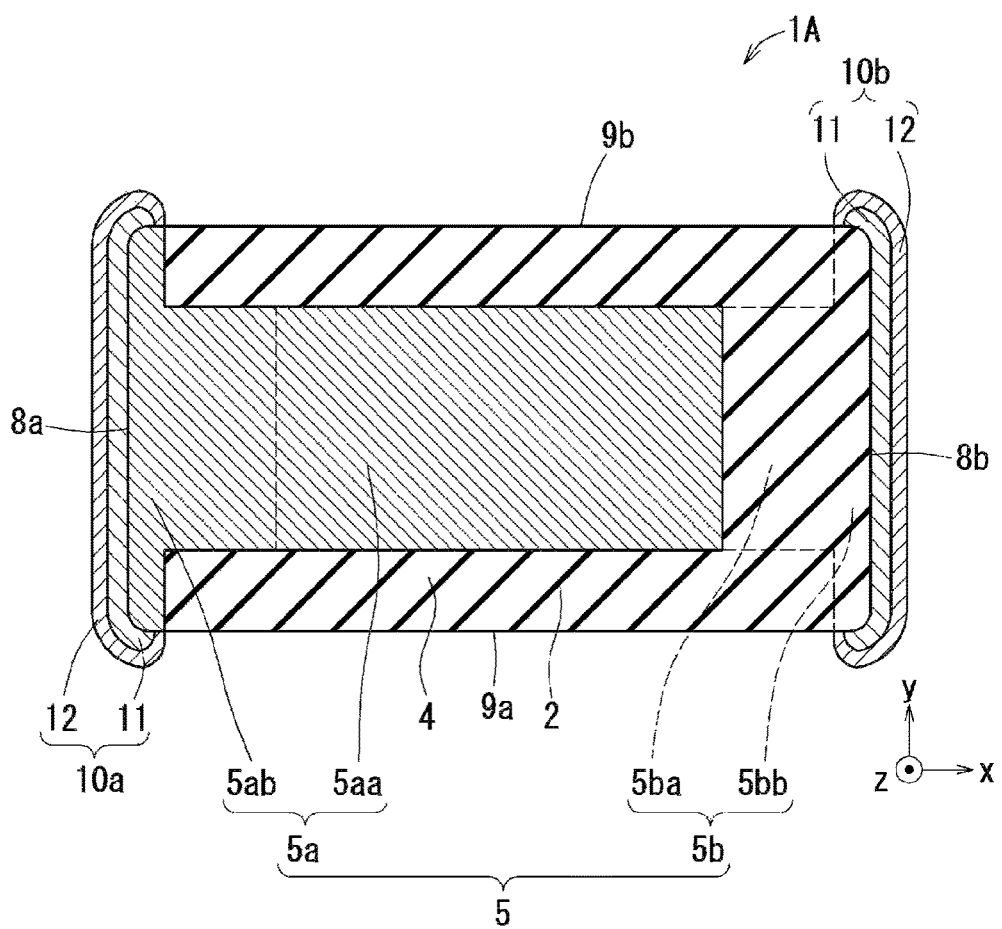
FIG. 18A is a sectional view taken along line XVIIIA-XVIIIA illustrated in FIG. 17.
Figure 18B:
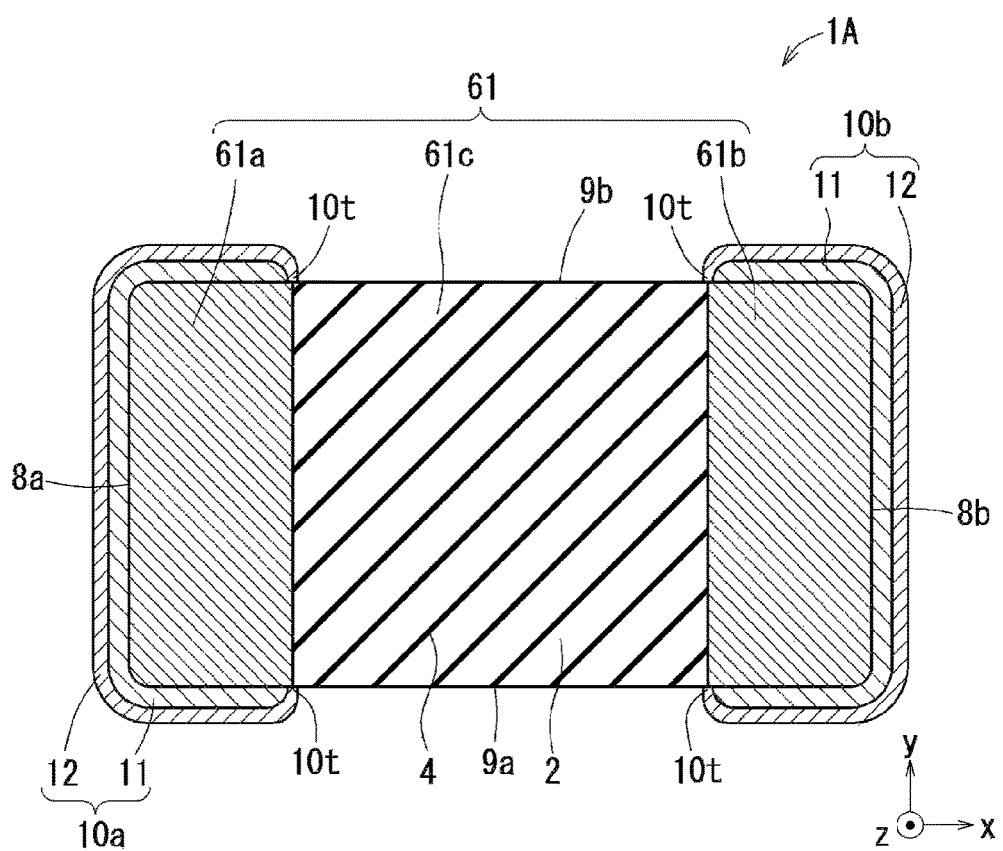
FIG. 18B is a sectional view taken along line XVIIIB-XVIIIB illustrated in FIG. 17.

FIGS. 15, 16, 17, 18A, and 18B relate to the multilayer ceramic capacitor according to the other embodiment. FIG. 15 is a perspective view illustrating the multilayer ceramic capacitor according to the other embodiment. FIG. 16 is a perspective view illustrating a laminate of the multilayer ceramic capacitor illustrated in FIG. 15. FIG. 17 is a sectional view taken along line XVII-XVII illustrated in FIG. 15. FIG. 18A is a sectional view taken along line XVIIIA-XVIIIA illustrated in FIG. 17. FIG. 18B is a sectional view taken along line XVIIIB-XVIIIB illustrated in FIG. 17. FIG. 18A illustrates an end surface taken along line XVIIIA-XVIIIA illustrated in FIG. 17.

In the present embodiment, the structures of the internal electrode layers 5 and the external electrodes 10*a* and 10*b* of a multilayer ceramic capacitor 1A are different from those of the multilayer ceramic capacitor 1 and the other structures are the same as or similar to those of the multilayer ceramic capacitor 1. Thus, the detailed description of the same or similar structure is omitted.

As illustrated in FIGS. 16, 17, and 18A, in the multilayer ceramic capacitor 1A, the drawn portion 5*ab* of each of the first internal electrode layers 5*a* is exposed at the first end surface 8*a* and the side surfaces 9*a* and 9*b*, and the drawn portion 5*bb* of each of the second internal electrode layers 5*b* is exposed at the second end surface 8*b* and the side surfaces 9*a* and 9*b*. As illustrated in FIGS. 16, 17, and 18B, the first dummy electrode 61*a* is exposed at the first surface 7*a*, the first end surface 8*a*, and the side surfaces 9*a* and 9*b*, and the second dummy electrode 61*b* is exposed at the first surface 7*a*, the second end surface 8*b*, and the side surfaces 9*a* and 9*b*. The third dummy electrode 62*a* is exposed at the second surface 7*b*, the first end surface 8*a*, and the side surfaces 9*a* and 9*b*, and the fourth dummy electrode 62*b* is exposed at the second surface 7*b*, the second end surface 8*b*, and the side surfaces 9*a* and 9*b*.

As illustrated in FIGS. 15, 17, 18A, and 18B, the first external electrode 10*a* extends from the first end surface 8*a* to the main surfaces 7a and 7b and the side surfaces 9a and 9b, and the second external electrode 10b extends from the second end surface 8b to the main surfaces 7a and 7b and the side surfaces 9a and 9b. The first external electrode 10a covers a portion of the first dummy electrode 61a exposed at the first surface 7a and a portion of the third dummy electrode 62a exposed at the second surface 7b. The first external electrode 10a covers portions of the first dummy electrode 61a, the third dummy electrode 62a, and the drawn portion 5ab of the first internal electrode layer 5a exposed at the first end surface 8a and the side surfaces 9a and 9b. The second external electrode 10b covers a portion of the second dummy electrode 61b exposed at the first surface 7a and a portion of the fourth dummy electrode 62b exposed at the second surface 7b. The second external electrode 10b covers portions of the second dummy electrode 61b, the fourth dummy electrode 62b, and the drawn portion 5bb of the second internal electrode layer 5b exposed at the second end surface 8b and the side surfaces 9a and 9b.

As illustrated in FIGS. 16, 18A, and 18B, in the first direction (x axis direction), the length of the portion of the drawn portion 5ab exposed at the side surfaces 9a and 9b is smaller than the length of the portions of the first dummy electrode 61a and the third dummy electrode 62a exposed at the side surfaces 9a and 9b. An end portion of the portion of the drawn portion 5ab on the second end surface 8b side exposed at the side surfaces 9a and 9b is positioned further to the first end surface 8a side than end portions of the portions of the first dummy electrode 61a and the third dummy electrode 62a on the second end surface 8b side exposed at the side surfaces 9a and 9b. In the first direction (x axis direction), the length of the portion of the drawn portion 5bb exposed at the side surfaces 9a and 9b is smaller than the length of the portions of the second dummy electrode 61b and the fourth dummy electrode 62b exposed at the side surfaces 9a and 9b. An end portion of the portion of the drawn portion 5bb on the first end surface 8a side exposed at the side surfaces 9a and 9b is positioned further to the second end surface 8b side than end portions of the portions of the second dummy electrode 61b and the fourth dummy electrode 62b on the first end surface 8a side exposed at the side surfaces 9a and 9b. As illustrated in FIG. 15, the external electrodes 10a and 10b have a U shape when seen in the second direction (y axis direction).

The multilayer ceramic capacitor 1A includes the dummy electrodes 61a to 62b having a greater thickness than the thickness of the internal electrode layers 5. Thus, the number of interfaces between different materials in the covering portions 61 and 62 can be reduced compared to the related-art multilayer ceramic capacitor. As a result, the occurrences of interlayer peeling in the covering portions 61 and 62 can be reduced when barrel polishing is performed on the laminate 2, and accordingly, the reliability of the multilayer ceramic capacitor 1A can be improved.

Portions of the external electrodes 10a and 10b positioned on the main surfaces 7a and 7b may only include the external layer 12. This can reduce the thickness of the portions of the external electrodes 10a and 10b positioned on the main surfaces 7a and 7b. As a result, the profile of the multilayer ceramic capacitor 1A can be reduced.

In the multilayer ceramic capacitor 1A, the side surfaces 9a and 9b, which exhibit a low solder wettability compared to the surfaces of the external electrodes 10a and 10b, are largely exposed. Thus, when the multilayer ceramic capacitor 1A is solder mounted on the external substrate, solder is unlikely to adhere to the side surfaces 9a and 9b. As a result, even when the profile of the multilayer ceramic capacitor 1A is reduced, the possibility of shorting between the first external electrode 10a and the second external electrode 10b due to solder adhering to the side surfaces 9a and 9b can be reduced.

The multilayer ceramic capacitor 1A may be structured such that all the dummy electrodes 61a to 62b have a greater thickness than the thickness of the internal electrode layers 5 as illustrated in FIGS. 16 and 17 or at least one of the dummy electrodes 61a to 62b has a greater thickness than the thickness of the internal electrode layers 5 as is the case with the multilayer ceramic capacitor 1 illustrated in FIG. 5.

Figure 19:
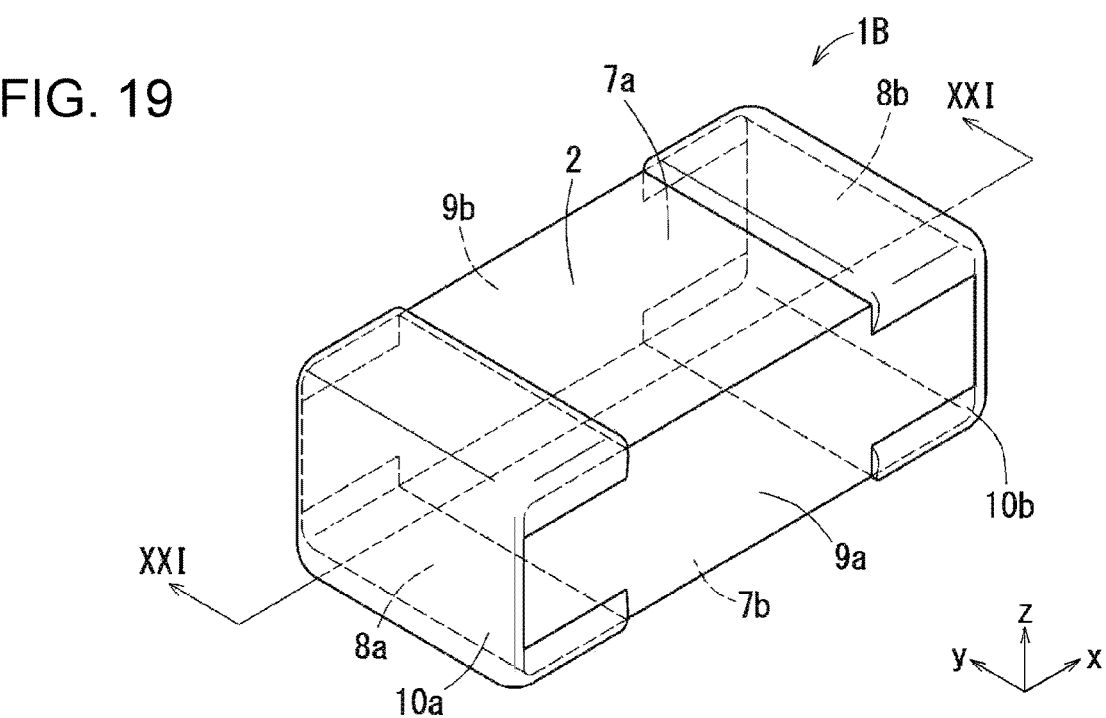
FIG. 19 is a perspective view illustrating a multilayer ceramic capacitor according to yet another embodiment.
Figure 20:
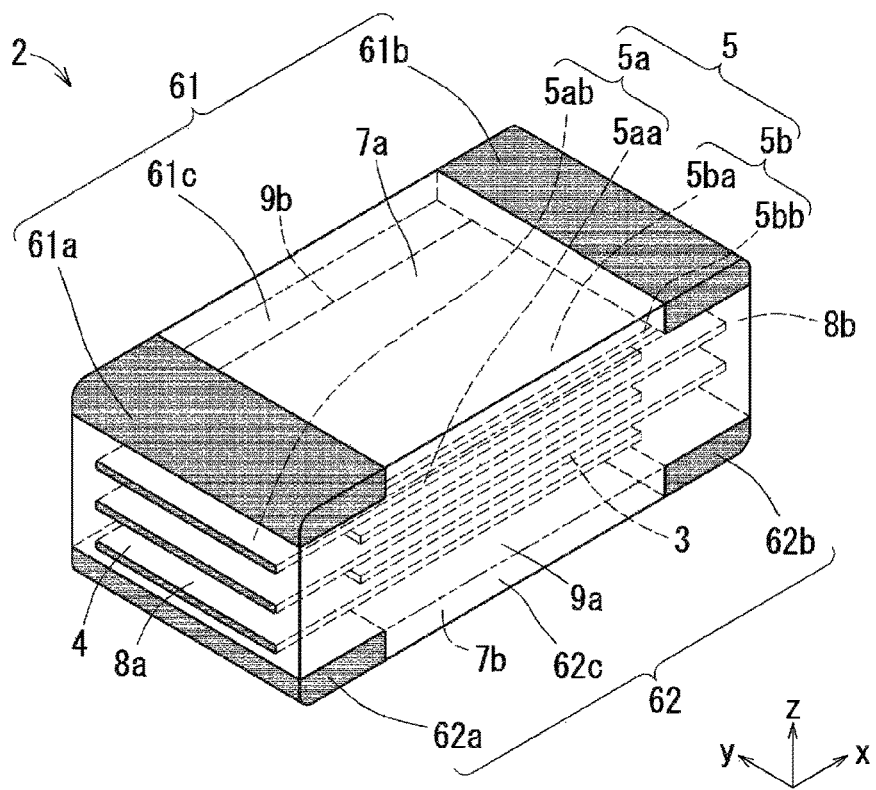
FIG. 20 is a perspective view illustrating a laminate of the multilayer ceramic capacitor illustrated in FIG. 19.
Figure 21:
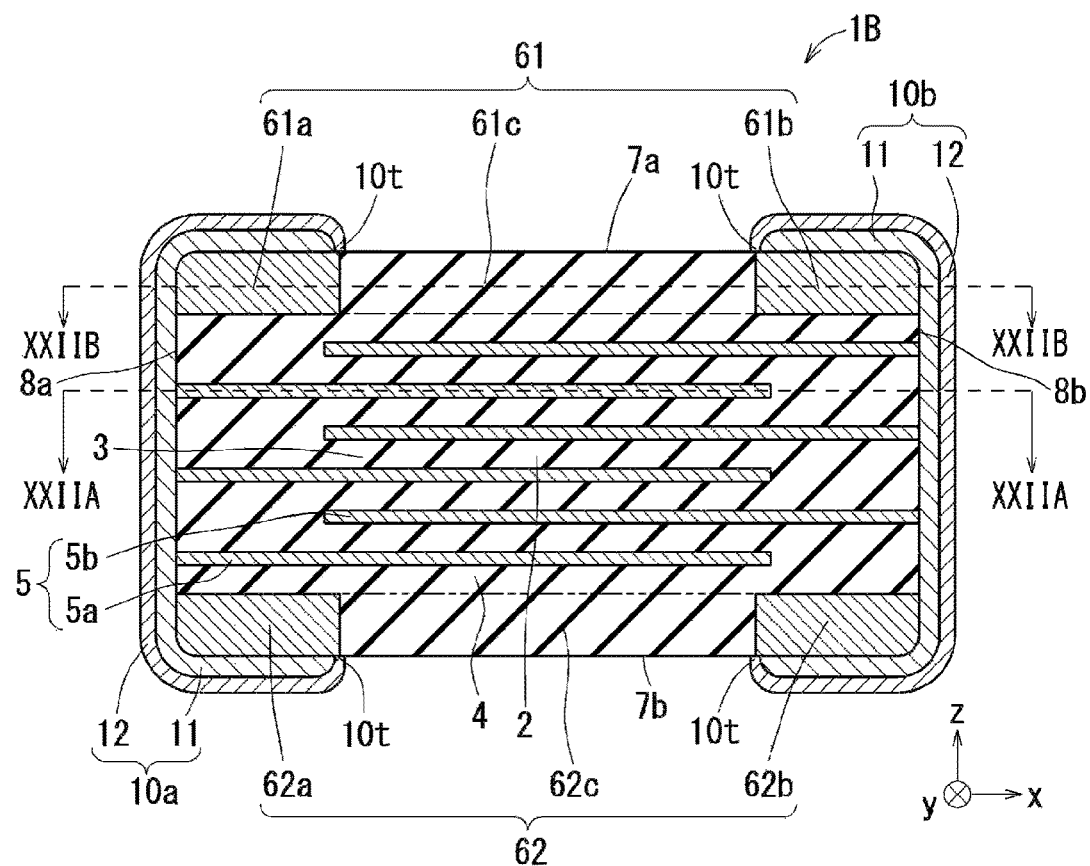
FIG. 21 is a sectional view taken along line XXI-XXI illustrated in FIG. 19.
Figure 22A:
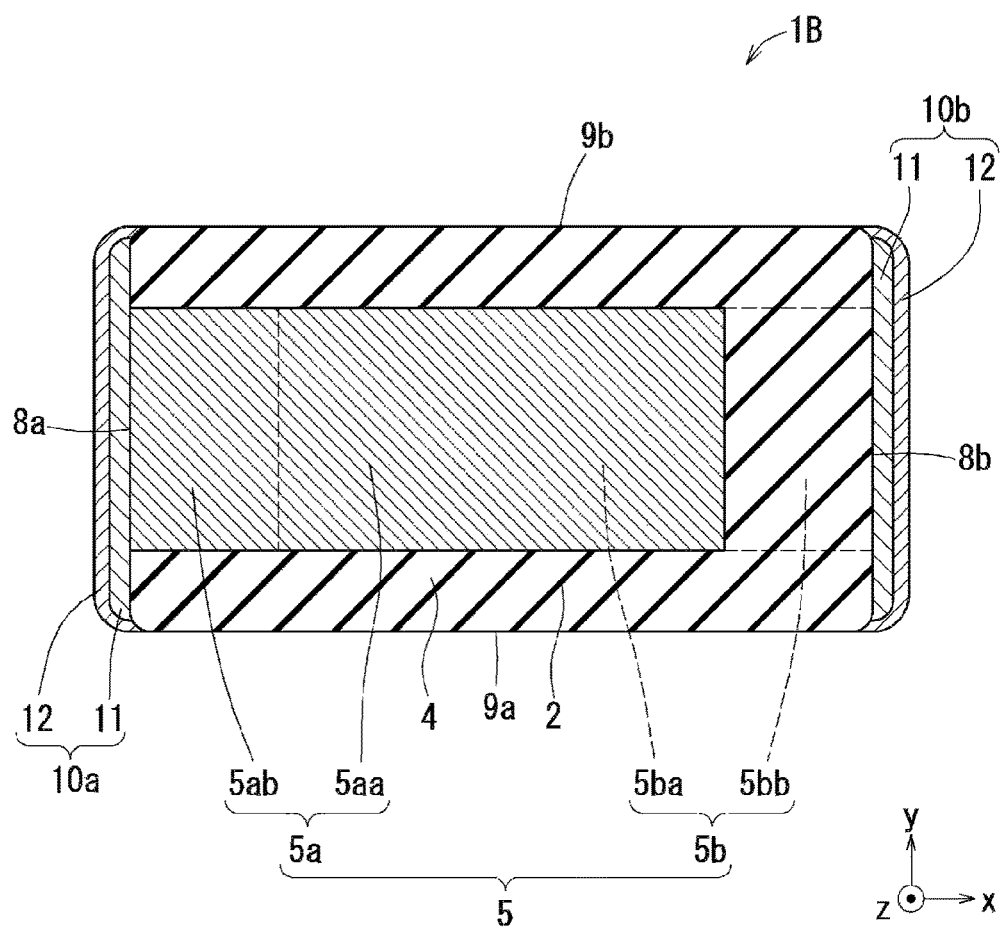
FIG. 22A is a sectional view taken along line XXIIA-XXIIA illustrated in FIG. 21.
Figure 22B:
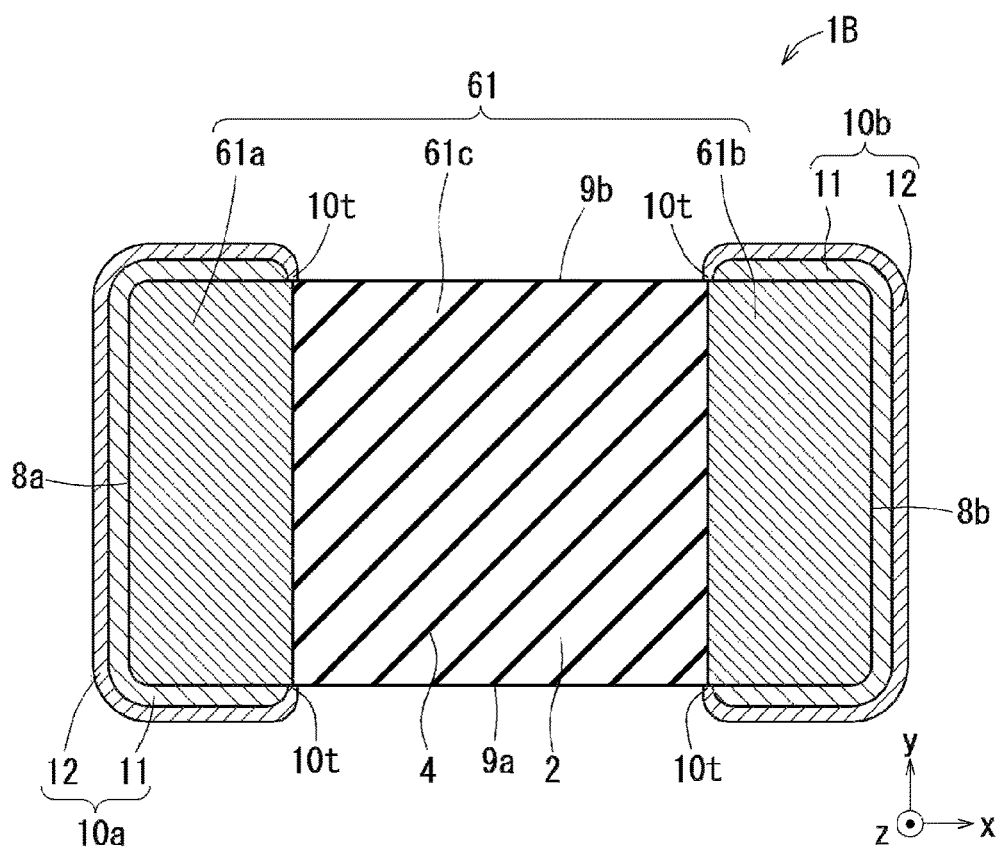
FIG. 22B is a sectional view taken along line XXIIB-XXIIB illustrated in FIG. 21.

FIGS. 19, 20, 21, 22A and 22B relate to a multilayer ceramic capacitor according to yet another embodiment. FIG. 19 is a perspective view illustrating the multilayer ceramic capacitor according to yet the other embodiment. FIG. 20 is a perspective view illustrating a laminate of the multilayer ceramic capacitor illustrated in FIG. 19. FIG. 21 is a sectional view taken along line XXI-XXI illustrated in FIG. 19. FIG. 22A is a sectional view taken along line XXIIA-XXIIA illustrated in FIG. 21. FIG. 22B is a sectional view taken along line XXIIB-XXIIB illustrated in FIG. 21. FIG. 22A illustrates an end surface taken along line XXIIA-XXIIA illustrated in FIG. 21.

In the present embodiment, the structures of the internal electrode layers 5, the dummy electrodes 61a to 62b, and the external electrodes 10a and 10b of a multilayer ceramic capacitor 1B are different from those of the multilayer ceramic capacitor 1 and the other structures are the same as or similar to those of the multilayer ceramic capacitor 1. Thus, the detailed description of the same or similar structure is omitted.

As illustrated in FIGS. 20 and 22A, in the multilayer ceramic capacitor 1B, the drawn portion 5ab of each of the first internal electrode layers 5a is exposed only at the first end surface 8a and not exposed at the side surfaces 9a and 9b. The drawn portion 5bb of each of the second internal electrode layers 5b is exposed only at the second end surface 8b and not exposed at the side surfaces 9a and 9b. As illustrated in FIGS. 20 and 21, the first dummy electrode 61a is exposed at the first surface 7a, the first end surface 8a, and the side surfaces 9a and 9b, and the second dummy electrode 61b is exposed at the first surface 7a, the second end surface 8b, and the side surfaces 9a and 9b. The third dummy electrode 62a is exposed at the second surface 7b, the first end surface 8a, and the side surfaces 9a and 9b, and the fourth dummy electrode 62b is exposed at the second surface 7b, the second end surface 8b, and the side surfaces 9a and 9b.

As illustrated in FIGS. 19, 21, and 22B, the first external electrode 10a extends from the first end surface 8a to the main surfaces 7a and 7b and the side surfaces 9a and 9b, and the second external electrode 10b extends from the second end surface 8b to the main surfaces 7a and 7b and the side surfaces 9a and 9b. As illustrated in FIGS. 21 and 22B, the first external electrode 10a covers a portion of the first dummy electrode 61a exposed at the first surface 7a and the side surfaces 9a and 9b and a portion of the third dummy electrode 62a exposed at the second surface 7b and the side surfaces 9a and 9b. The second external electrode 10b covers a portion of the second dummy electrode 61b exposed at the first surface 7a and the side surfaces 9a and 9b and a portion of the fourth dummy electrode 62b exposed at the second surface 7b and the side surfaces 9a and 9b. As illustrated in FIG. 19, the external electrodes 10a and 10b have a U shape when seen in the second direction (y axis direction).

The multilayer ceramic capacitor 1B includes the dummy electrodes 61a to 62b having a greater thickness than the thickness of the internal electrode layers 5. Thus, the number of interfaces between different materials in the covering portions 61 and 62 can be reduced compared to the related-art multilayer ceramic capacitor. As a result, the occurrences of interlayer peeling in the covering portions 61 and 62 can be reduced when barrel polishing is performed on the laminate 2, and accordingly, the reliability of the multilayer ceramic capacitor 1B can be improved.

Portions of the external electrodes 10a and 10b positioned on the main surfaces 7a and 7b may only include the external layer 12. This can reduce the thickness of the portions of the external electrodes 10a and 10b positioned on the main surfaces 7a and 7b. As a result, the profile of the multilayer ceramic capacitor 1B can be reduced.

In the multilayer ceramic capacitor 1B, the side surfaces 9a and 9b, which exhibit a low solder wettability compared to the surfaces of the external electrodes 10a and 10b, are largely exposed. Thus, when the multilayer ceramic capacitor 1B is solder mounted on the external substrate, solder is unlikely to adhere to the side surfaces 9a and 9b. As a result, even when the profile of the multilayer ceramic capacitor 1B is reduced, the possibility of shorting between the first external electrode 10a and the second external electrode 10b due to solder adhering to the side surfaces 9a and 9b can be reduced.

The multilayer ceramic capacitor 1B may be structured such that all the dummy electrodes 61a to 62b have a greater thickness than the thickness of the internal electrode layers 5 as illustrated in FIGS. 20 and 21 or at least one of the dummy electrodes 61a to 62b has a greater thickness than the thickness of the internal electrode layers 5 as is the case with the multilayer ceramic capacitor 1 illustrated in FIG. 5.

Figure 23:
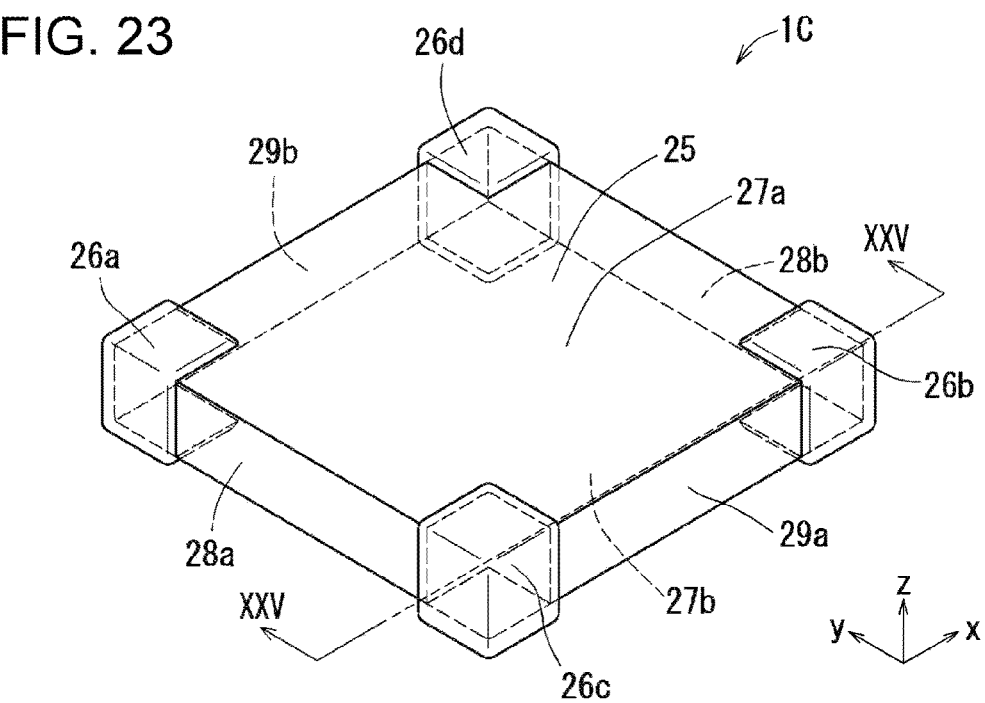
FIG. 23 is a perspective view illustrating a multilayer ceramic capacitor according to yet another embodiment.
Figure 24:
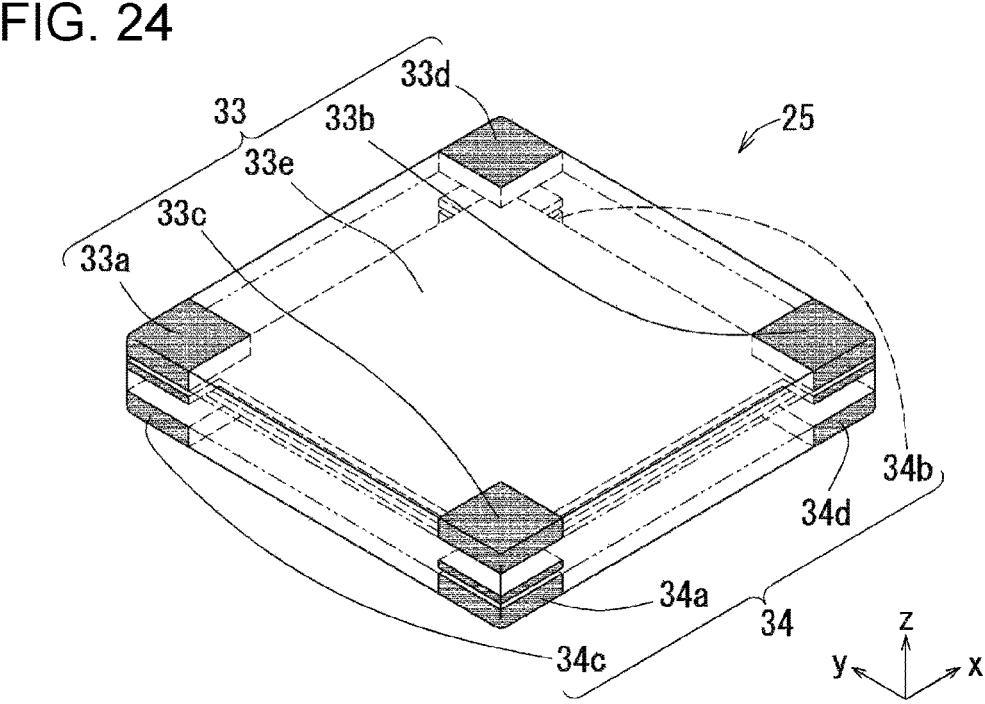
FIG. 24 is a perspective view illustrating a laminate of the multilayer ceramic capacitor illustrated in FIG. 23.
Figure 25:
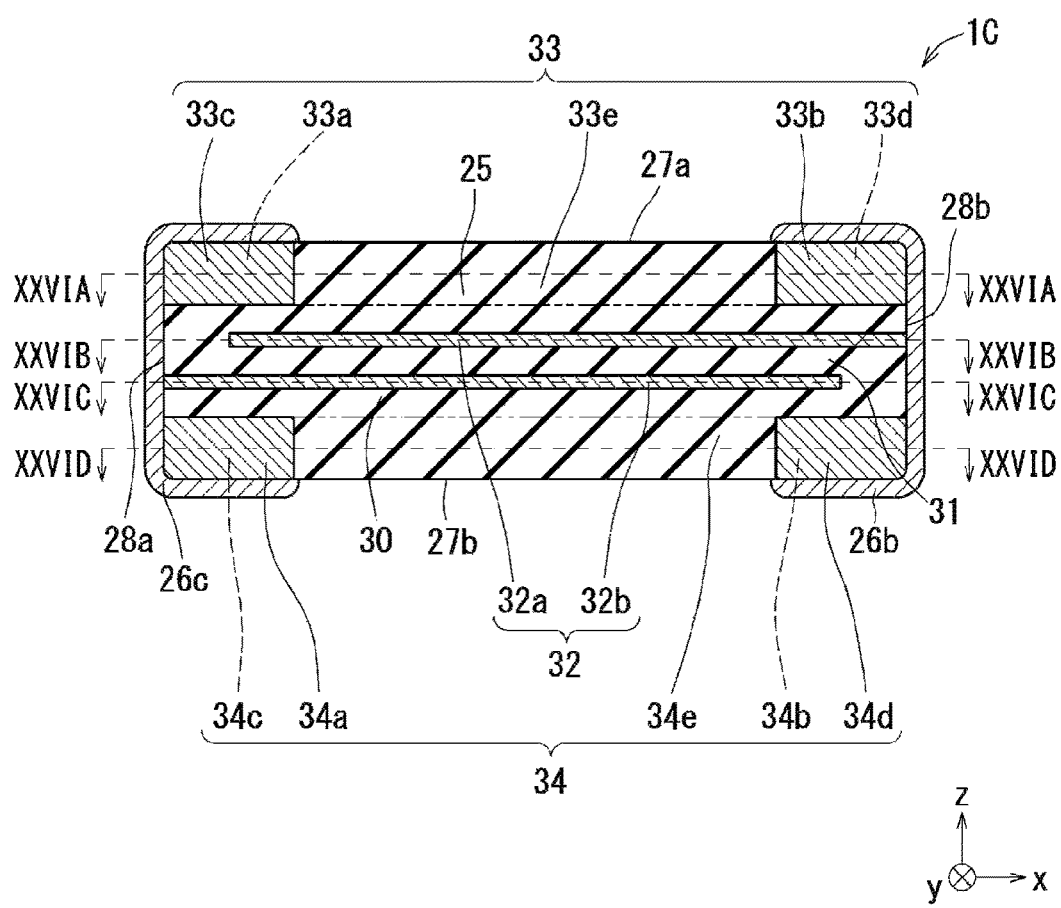
FIG. 25 is a sectional view taken along line XXV-XXV illustrated in FIG. 23.
Figure 26A:
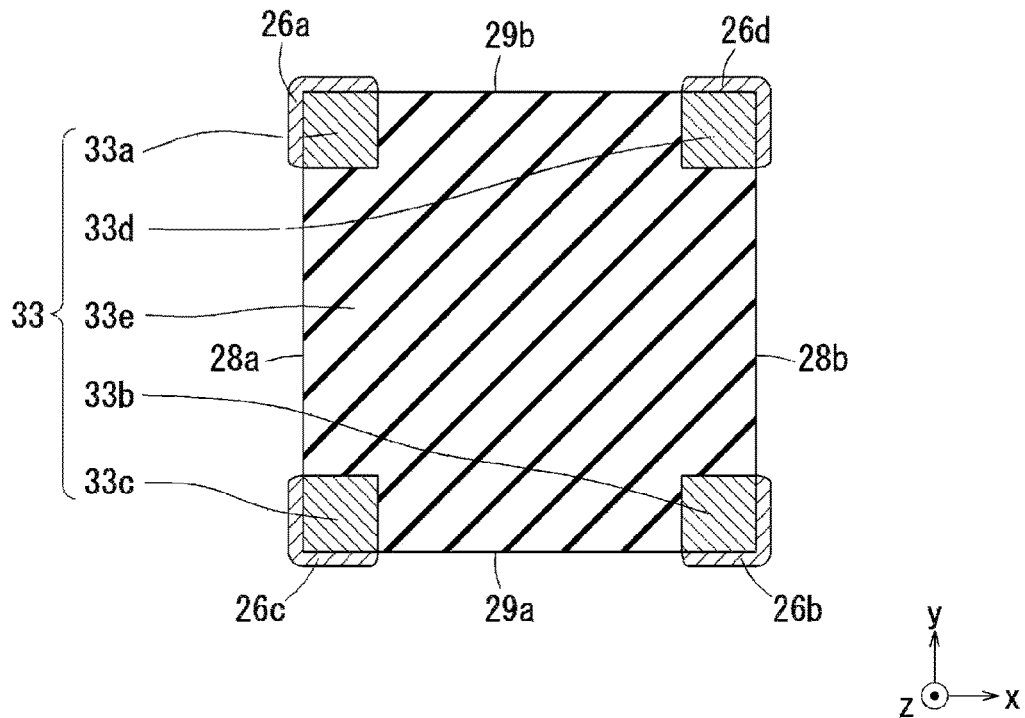
FIG. 26A is a sectional view taken along line XXVIA-XXVIA illustrated in FIG. 25.
Figure 26B:
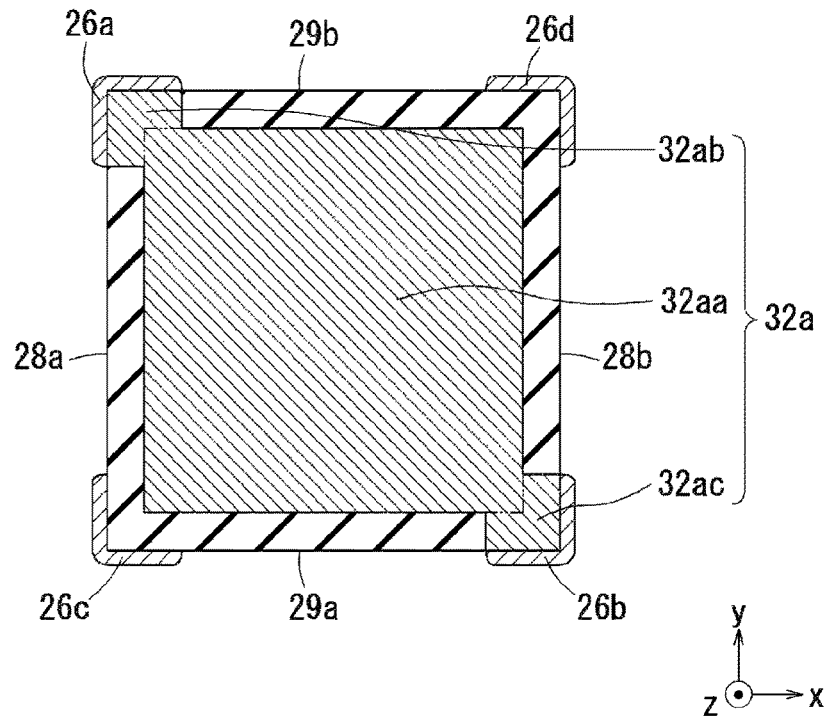
FIG. 26B is a sectional view taken along line XXVIB-XXVIB illustrated in FIG. 25.
Figure 26C:
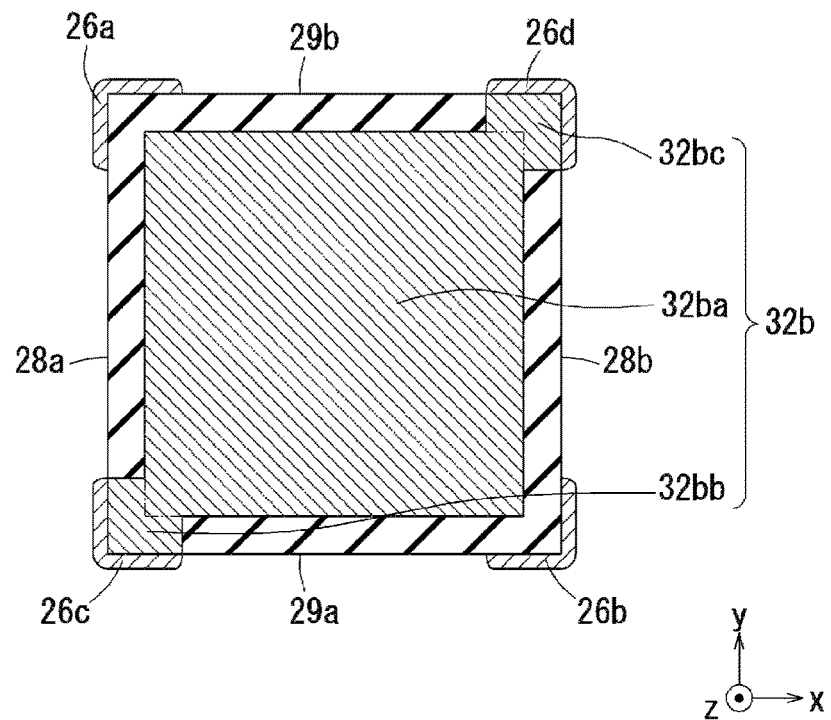
FIG. 26C is a sectional view taken along line XXVIC-XXVIC illustrated in FIG. 25.
Figure 26D:
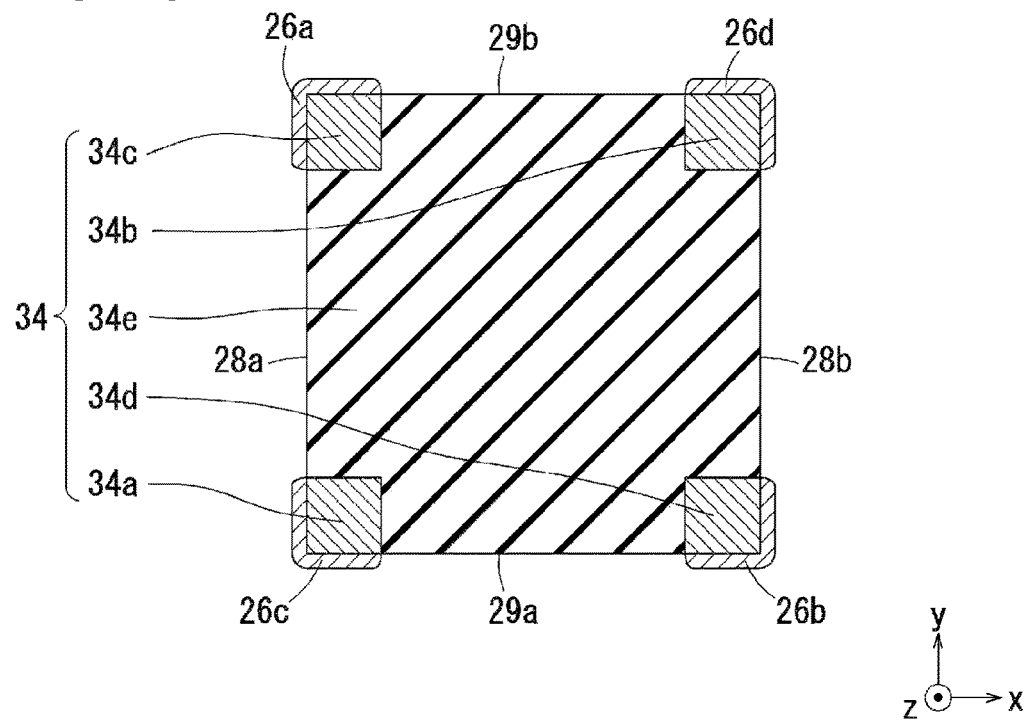
FIG. 26D is a sectional view taken along line XXVID-XXVID illustrated in FIG. 25.

FIGS. 23, 24, 25, 26A, 26B, 26C, and 26D relate to a multilayer ceramic capacitor according to yet another embodiment. FIG. 23 is a perspective view illustrating the multilayer ceramic capacitor according to yet the other embodiment. FIG. 24 is a perspective view illustrating a laminate of the multilayer ceramic capacitor illustrated in FIG. 23. FIG. 25 is a sectional view taken along line XXV-XXV illustrated in FIG. 23. FIG. 26A is a sectional view taken along line XXVIA-XXVIA illustrated in FIG. 25. FIG. 26B is a sectional view taken along line XXVIB-XXVIB illustrated in FIG. 25. FIG. 26C is a sectional view taken along line XXVIC-XXVIC illustrated in FIG. 25. FIG. 26D is a sectional view taken along line XXVID-XXVID illustrated in FIG. 25. Portions of internal electrode layers and dummy electrodes exposed at a surface of the laminate are hatched in FIG. 24.

In the present embodiment, as illustrated in FIG. 23, a multilayer ceramic capacitor 1C includes a laminate 25, a first external electrode 26a, a second external electrode 26b, a third external electrode 26c, and a fourth external electrode 26d. Hereinafter, the first external electrode 26a, the second external electrode 26b, the third external electrode 26C, and the fourth external electrode 26d may be collectively described as external electrodes 26a to 26d.

As illustrated in FIG. 24, the laminate 25 has a rectangular parallelepiped shape. The laminate 25 includes a first surface 27a and a second surface 27b that face each other, a first end surface 28a and a second end surface 28b that face each other, and a first side surface 29a and a second side surface 29b that face each other. The first end surface 28a and the second end surface 28b may be perpendicular to the first direction (x axis direction). The first side surface 29a and the second side surface 29b may be perpendicular to the second direction (y axis direction). The first surface 27a and the second surface 27b may be perpendicular to the third direction (z axis direction). The first surface 27a and the second surface 27b may have a substantially square shape in plan view.

As illustrated in FIG. 25, the laminate 25 includes an active portion 30, a first covering portion 33, and a second covering portion 34. The active portion 30 is formed by alternately laminating the dielectric layers 31 and internal electrode layers 32. The dielectric layers 31 and the internal electrode layers 32 are laminated in the third direction (z axis direction). The active portion 30 forms electrostatic capacitance. Referring to FIG. 25, a boundary between the active portion 30 and the first covering portion and a boundary between the active portion 30 and the second covering portion are represented by two-dot chain lines. However, actual boundaries are not clearly presented. Hereinafter, the first covering portion 33 and the second covering portion 34 may be collectively described as covering portions 33 and 34.

The dielectric layers 31 may be formed of a ceramic material a main ingredient of which is, for example, $BaTiO_3$, $CaTiO_3$, $SrTiO_3$, or $BaZrO_3$. The internal electrode layers 32 may be formed of a metal material a main ingredient of which is, for example, a metal such as Ni, Cu, Sn, Pt, Pd, Ag, or Au or an alloy of these metals.

The internal electrode layers 32 include a first internal electrode layer 32a and a second internal electrode layer 32b. A polarity of the first internal electrode layer 32a and a polarity of the second internal electrode layer 32b are different from each other. The active portion 30 is formed by laminating the first internal electrode layer 32a and the second internal electrode layer 32b with a dielectric layer 31 interposed therebetween. Referring to FIGS. 24 and 25, the active portion 30 includes two internal electrode layers 32. However, the active portion 30 may includes more than two internal electrode layers 32.

As illustrated in FIG. 26B, the first internal electrode layer 32a includes a capacitance forming portion 32aa, a first drawn portion 32ab, and a second drawn portion 32ac. The first drawn portion 32ab is exposed at the first end surface 28a and the second side surface 29b. The second drawn portion 32ac is exposed at the second end surface 28b and the first side surface 29a. As illustrated in FIG. 26B, in plan view, the first drawn portion 32ab and the second drawn portion 32ac are positioned at two corner portions, respectively, positioned on a diagonal line of the laminate 25.

As illustrated in FIG. 26C, the second internal electrode layer 32b includes a capacitance forming portion 32ba, a third drawn portion 32bb, and a fourth drawn portion 32bc. The third drawn portion 32bb is exposed at the first end surface 28a and the first side surface 29a. The fourth drawn portion 32bc is exposed at the second end surface 28b and the second side surface 29b. In plan view, the third drawn portion 32bb and the fourth drawn portion 32bc are positioned at two corner portions, respectively, positioned on a diagonal line of the laminate 25.

The capacitance forming portion 32aa and the capacitance forming portion 32ba overlap each other in plan view. The first drawn portion 32ab does not overlap the third drawn portion 32bb or the fourth drawn portion 32bc in plan view. The second drawn portion 32ac does not overlap the third drawn portion 32bb or the fourth drawn portion 32bc in plan view.

As illustrated in FIG. 25, the first covering portion 33 and the second covering portion 34 are positioned at respective ends of the active portion 30 in the third direction (z axis direction).

As illustrated in FIG. 26A, the first covering portion 33 includes four dummy electrodes 33a, 33b, 33c, and 33d and a first dielectric portion 33e. In plan view, four dummy electrodes 33a, 33b, 33c, and 33d are respectively positioned at four corner portions of the laminate 25. The dummy electrodes 33a, 33b, 33c, and 33d are exposed at the first surface 27a. The dummy electrode 33a is further exposed at the first end surface 28a and the second side surface 29b. The dummy electrode 33b is further exposed at the second end surface 28b and the first side surface 29a. The dummy electrode 33c is further exposed at the first end surface 28a and the first side surface 29a. The dummy electrode 33d is further exposed at the second end surface 28b and the second side surface 29b. The shape of the dummy electrodes 33a, 33b, 33c, and 33d may be, for example, a rectangular parallelepiped shape, a cubic shape, a triangular prism shape, or a quarter-cylindrical shape. The dummy electrodes 33a, 33b, 33c, and 33d may be formed of a metal material used to form the internal electrode layers 32. The first dielectric portion 33e is formed of a dielectric material so as to electrically insulate the dummy electrodes 33a, 33b, 33c, and 33d from each other. The first dielectric portion 33e may be formed of a ceramic material used to form the dielectric layers 31.

As illustrated in FIG. 26D, the second covering portion 34 includes four dummy electrodes 34a, 34b, 34c, and 34d and a second dielectric portion 34e. In plan view, four dummy electrodes 34a, 34b, 34c, and 34d are respectively positioned at four corner portions of the laminate 25. The dummy electrodes 34a, 34b, 34c, and 34d are exposed at the second surface 27b. The dummy electrode 34a is further exposed at the first end surface 28a and the first side surface 29a. The dummy electrode 34b is further exposed at the second end surface 28b and the second side surface 29b. The dummy electrode 34c is further exposed at the first end surface 28a and the second side surface 29b. The dummy electrode 34d is further exposed at the second end surface 28b and the first side surface 29a. The shape of the dummy electrodes 34a, 34b, 34c, and 34d may be, for example, a rectangular parallelepiped shape, a cubic shape, a triangular prism shape, or a quarter-cylindrical shape. The dummy electrodes 34a, 34b, 34c, and 34d may be formed of a metal material used to form the internal electrode layers 32. The second dielectric portion 34e is formed of a dielectric material so as to electrically insulate the dummy electrodes 34a, 34b, 34c, and 34d from each other. The second dielectric portion 34e may be formed of a ceramic material used to form the dielectric layers 31. Hereinafter, the dummy electrodes 33a, 33b, 33c, and 33d and the dummy electrodes 34a, 34b, 34c, and 34d may be collectively described as dummy electrodes 33a to 34d.

The first external electrode 26a is positioned at the first surface 27a, the first end surface 28a, the second side surface 29b, and the second surface 27b. The first external electrode 26a is connected to a portion of the first drawn portion 32ab exposed at the surface of the laminate 25 and portions of the dummy electrode 33a and the dummy electrode 34c exposed at the surface of the laminate 25. The first external electrode 26a may completely cover the portion of the first drawn portion 32ab exposed at the surface of the laminate 25 and the portions of the dummy electrode 33a and the dummy electrode 34c exposed at the surface of the laminate 25.

The second external electrode 26b is positioned at the first surface 27a, the second end surface 28b, the first side surface 29a, and the second surface 27b. The second external electrode 26b is connected to a portion of the second drawn portion 32ac exposed at the surface of the laminate 25 and the portions of the dummy electrode 33b and the dummy electrode 34d exposed at the surface of the laminate 25. The second external electrode 26b may completely cover the portion of the second drawn portion 32ac exposed at the surface of the laminate 25 and the portions of the dummy electrode 33b and the dummy electrode 34d exposed at the surface of the laminate 25.

The third external electrode 26c is positioned at the first surface 27a, the first end surface 28a, the first side surface 29a, and the second surface 27b. The third external electrode 26c is connected to a portion of the third drawn portion 32bb exposed at the surface of the laminate 25 and the portions of the dummy electrode 33c and the dummy electrode 34a exposed at the surface of the laminate 25. The third external electrode 26c may completely cover the portion of the third drawn portion 32bb exposed at the surface of the laminate 25 and the portions of the dummy electrode 33c and the dummy electrode 34a exposed at the surface of the laminate 25.

The fourth external electrode 26d is positioned at the first surface 27a, the second end surface 28b, the second side surface 29b, and the second surface 27b. The fourth external electrode 26d is connected to a portion of the fourth drawn portion 32bc exposed at the surface of the laminate 25 and the portions of the dummy electrode 33d and the dummy electrode 34b exposed at the surface of the laminate 25. The fourth external electrode 26d may completely cover the portion of the fourth drawn portion 32bc exposed at the surface of the laminate 25 and the portions of the dummy electrode 33d and the dummy electrode 34b exposed at the surface of the laminate 25.

The external electrodes 26a to 26d may be formed of a metal material a main ingredient of which is, for example, a metal such as Ni, Cu, Sn, Pt, Pd, Ag, or Au or an alloy of these metals. The external electrodes 26a to 26d may be formed by using a thick-film formation technique such as dipping, screen printing, or gravure printing. As is the case with the external electrodes 10a and 10b illustrated in FIGS. 3 and 4, the external electrodes 26a to 26d may each include an underlying layer in contact with the surface of the laminate 25 and an external layer covering the underlying layer.

A manufacturing method of the multilayer ceramic capacitor 1C is the same as or similar to the manufacturing method of the multilayer ceramic capacitor 1. First, a mother laminate is created, and a plurality of unfired laminates 25 are created by cutting the mother laminate. Then, the degreasing process is performed on each unfired laminate 25, and after that, the laminate 25 having undergone the degreasing process is fired. Then, when the barrel polishing process is performed on the laminate 2 after the firing, the laminate 25 as illustrated in FIG. 24 is obtained. When the external electrodes 26a to 26d are formed on the obtained laminate 25, the multilayer ceramic capacitor 1C can be manufactured.

As illustrated in FIGS. 24 and 25, the multilayer ceramic capacitor 1C is structured such that the dummy electrodes 33a to 34d have a greater thickness than the thickness of the one internal electrode layer 32 in the third direction (z axis direction). Thus, in the multilayer ceramic capacitor 1C, the number of interfaces between different materials in the covering portions 33 and 34 can be reduced compared to the related-art multilayer ceramic capacitor. As a result, the occurrences of interlayer peeling in the covering portions 33 and 34 can be reduced when barrel polishing is performed on the laminate 25, and accordingly, the reliability of the multilayer ceramic capacitor 1C can be improved.

In the multilayer ceramic capacitor 1C, it is sufficient that at least one of the dummy electrodes 33a to 34d have a greater thickness than the thickness of the internal electrode layers 32. The multilayer ceramic capacitor 1C may include the dummy electrode 33a to 34d having a thickness smaller than or equal to the thickness of the internal electrode layers 32 as is the case with the second dummy electrode 61b, the third dummy electrode 62a, and the fourth dummy electrode 62b illustrated in FIG. 5. For example, when the thickness of the dummy electrode 33b is smaller than or equal to the thickness of the internal electrode layers 32, the laminate 25 may include, inside (on the lower side of) the dummy electrode 33b in the third direction (z axis direction), auxiliary electrode portions which are the same as or similar to the auxiliary electrode portions 61ba, 62aa, 62ba illustrated in FIG. 5.

Each of the dummy electrodes 33a to 34d may be a single-unit dummy electrode. The dummy electrodes 33a to 34d may include a plurality of dummy electrode layers that are laminated as is the case with the dummy electrodes 61a to 62b illustrated in FIG. 6. In this case, formation of the dummy electrodes 33a to 34d having the dimensions as designed is facilitated, and the reliability of the multilayer ceramic capacitor 1C can be improved.

An interface between the first dielectric portion 33e and at least one selected from the group consisting of the dummy electrodes 33a, 33b, 33c, and 33d may include an uneven structure as is the case with the interfaces 61d and 62d illustrated in FIG. 7. In this case, even when the cracking occurs from the first covering portion 33 while the multilayer ceramic capacitor 1C is solder mounted on the external substrate, extension of the cracking to the active portion 30 can be suppressed. As a result, moisture resistance of the multilayer ceramic capacitor 1C can be improved, and accordingly, the reliability can be improved. An interface between the second dielectric portion 34e and at least one selected from the group consisting of the dummy electrodes 34a, 34b, 34c, and 34d may include an uneven structure. Also in this case, as described above, the moisture resistance of the multilayer ceramic capacitor 1C can be improved, and accordingly, the reliability can be improved.

Although the embodiments according to the present disclosure have been described in detail, the present disclosure is not limited to the above-described embodiments. Various changes, improvements, and the like are possible without departing from the gist of the present disclosure.

Figure 27:
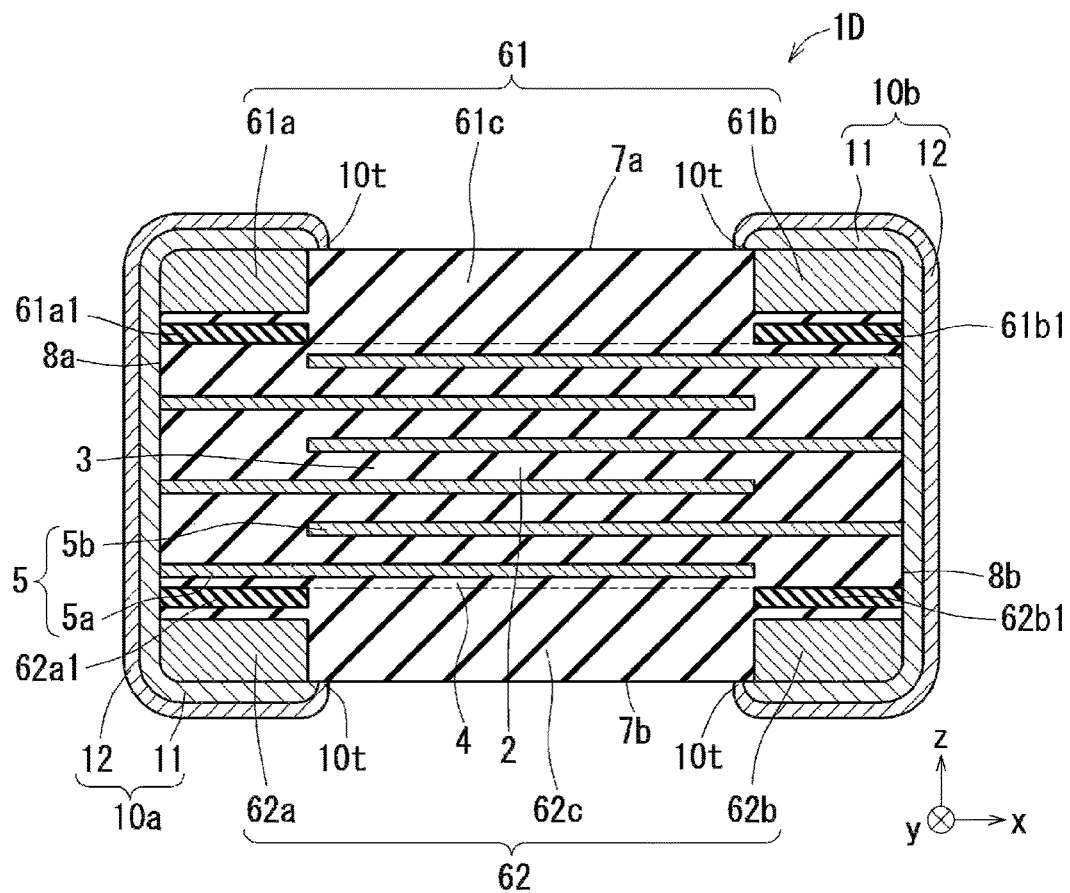
FIG. 27 is a sectional view illustrating a multilayer ceramic capacitor according to yet another embodiment.

FIG. 27 is a sectional view illustrating a multilayer ceramic capacitor 1D according to yet another embodiment of the present disclosure. The present embodiment is similar to the embodiment illustrated in FIG. 3. Thus, corresponding parts are denoted by the same reference numerals, and redundant description is omitted. In the present embodiment, intermediate dummy electrodes 61a1, 61b1, 62a1, and 62b1 may be further provided in the multilayer ceramic capacitor 1D. The intermediate dummy electrodes 61a1 and 61b1 may be provided, for example, such that intermediate dummy electrodes 61f and 61g are respectively provided inside (on the lower side of) the first and second dummy electrodes 61a and 61b in the third direction (z axis direction) between the first and second dummy electrodes 61a and 61b and electrode layers close to the lower sides of the first and second dummy electrodes 61a and 61b. The intermediate dummy electrodes 61a1 and 61b1 are electrically insulated from each other by a dielectric layer formed of a dielectric material which is the same as or similar to the material of the dielectric portion. The dielectric layer may be formed of a ceramic material. The intermediate dummy electrodes 62a1 and 62b1 may be provided such that the intermediate dummy electrodes 61a1 and 61b1 are respectively provided inside (on the upper side of) the third and fourth dummy electrodes 62a and 62b between the third and fourth dummy electrodes 62a and 62b and electrode layers close to the third and fourth dummy electrodes 62a and 62b. Thus, the areas of exposed portions of the intermediate dummy electrodes 61a1, 61b1, 62a1, and 62b1 can be increased in the end surfaces 8a and 8b and the side surfaces 9a and 9b. Thus, the reliability of the multilayer ceramic capacitor 1D can be effectively improved. When the underlying layer 11 is formed by plating, for example, the dummy electrode 61a is likely to be reached by a plating film that grows from an end portion, as a start point, of the first internal electrode layer 5a exposed at the first end surface 8a via the intermediate dummy electrode 61a1. Thus, formation of the underlying layer 11 is facilitated.

In plan view, the shape of the intermediate dummy electrodes 61a1, 61b1, 62a1, and 62b1 may be the same as or different from the shape of the dummy electrodes 61a, 61b, 62a, and 62b. The thickness of the intermediate dummy electrodes 61f, 61g, 62f, and 62g may be greater than the thickness of the internal electrode layers 5 in the third direction (z axis direction). The intermediate dummy electrodes 61a1, 61b1, 62a1, and 62b1 may have the substantially the same dimensions. The intermediate dummy electrodes 61a1, 61b1, 62a1, and 62b1 may be formed of the same material as the metal material used to form the dummy electrodes 61a, 61b, 62a, and 62b. When the intermediate dummy electrodes 61a1, 61b1, 62a1, and 62b1 are positioned between the active portion 3 and the covering portions 61 and 62, the plating film is likely to be formed from the active portion 3 to the main surface side.

Figure 28:
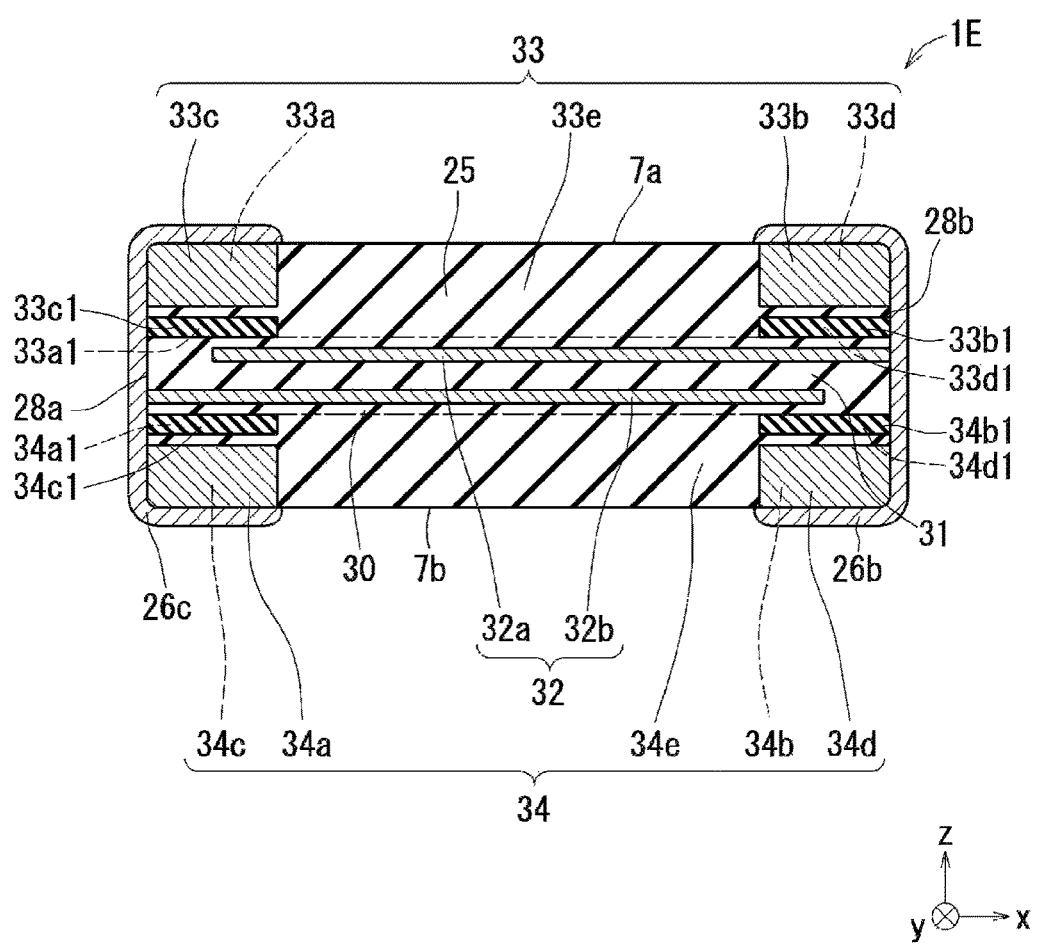
FIG. 28 is a sectional view illustrating a multilayer ceramic capacitor according to yet another embodiment.

FIG. 28 is a sectional view illustrating a multilayer ceramic capacitor 1E according to yet another embodiment of the present disclosure. The present embodiment is similar to the embodiment illustrated in FIG. 25. Thus, corresponding parts are denoted by the same reference numerals, and redundant description is omitted. In the present embodiment, intermediate dummy electrodes 33a1, 33c1, 33b1, 33d1, 34a1, 34c1, 34b1, and 34d1 may be further provided in the multilayer ceramic capacitor 1E. The intermediate dummy electrodes 33a1, 33c1, 33b1, and 33d1 may be provided, for example, such that intermediate dummy electrodes 33a1, 33c1, 33b1, and 33d1 are respectively provided inside (on the lower side of) the dummy electrodes 33a, 33c, 33b, and 33d in the third direction (z axis direction) between the dummy electrodes 33a, 33c, 33b, and 33d and electrode layers close to the dummy electrodes 33a, 33c, 33b, and 33d. The intermediate dummy electrodes 33a1, 33c1, 33b1, and 33d1 are electrically insulated from each other by a dielectric layer formed of a dielectric material which is the same as or similar to the material of the dielectric portion. The dielectric layer may be formed of a ceramic material. The intermediate dummy electrodes 34a1, 34c1, 34b1, and 34d1 may be provided such that the intermediate dummy electrodes 34a1, 34c1, 34b1, and 34d1 are respectively provided inside (on the upper side of) the dummy electrodes 34a, 34c, 34b, and 34d between the dummy electrodes 34a, 34c, 34b, and 34d and electrode layers close to the dummy electrodes 34a, 34c, 34b, and 34d.

In plan view, the shape of the intermediate dummy electrodes 33a1, 33c1, 33b1, 33d1, 34a1, 34c1, 34b1, and 34*d*1 may be the same as or different from the shape of the dummy electrodes 33*a*, 33*c*, 33*b*, 33*d*, 34*a*, 34*c*, 34*b*, and 34*d*. The thickness of the intermediate dummy electrodes 33*a*1, 33*c*1, 33*b*1, 33*d*1, 34*a*1, 34*c*1, 34*b*1, and 34*d*1 may be greater than the thickness of the internal electrode layers 32 in the third direction (z axis direction). The dummy electrodes 33*a*, 33*c*, 33*b*, 33*d*, 34*a*, 34*c*, 34*b*, and 34*d* may have the substantially the same dimensions. The intermediate dummy electrodes 33*a*1, 33*c*1, 33*b*1, 33*d*1, 34*a*1, 34*c*1, 34*b*1, and 34*d*1 may be formed of the metal material used to form the dummy electrodes 33*a*, 33*c*, 33*b*, 33*d*, 34*a*, 34*c*, 34*b*, and 34*d*. In the y axis direction, the length of the dummy electrodes 33*a*, 33*c*, 33*b*, 33*d*, 34*a*, 34*c*, 34*b*, and 34*d* may be smaller than the length of the underlying layer.

Thus, the plating film is likely to be formed from the active portion to the main surface side while the characteristic with which solder is unlikely to adhere to the side surfaces 9*a* and 9*b* is maintained.

Figure 29:
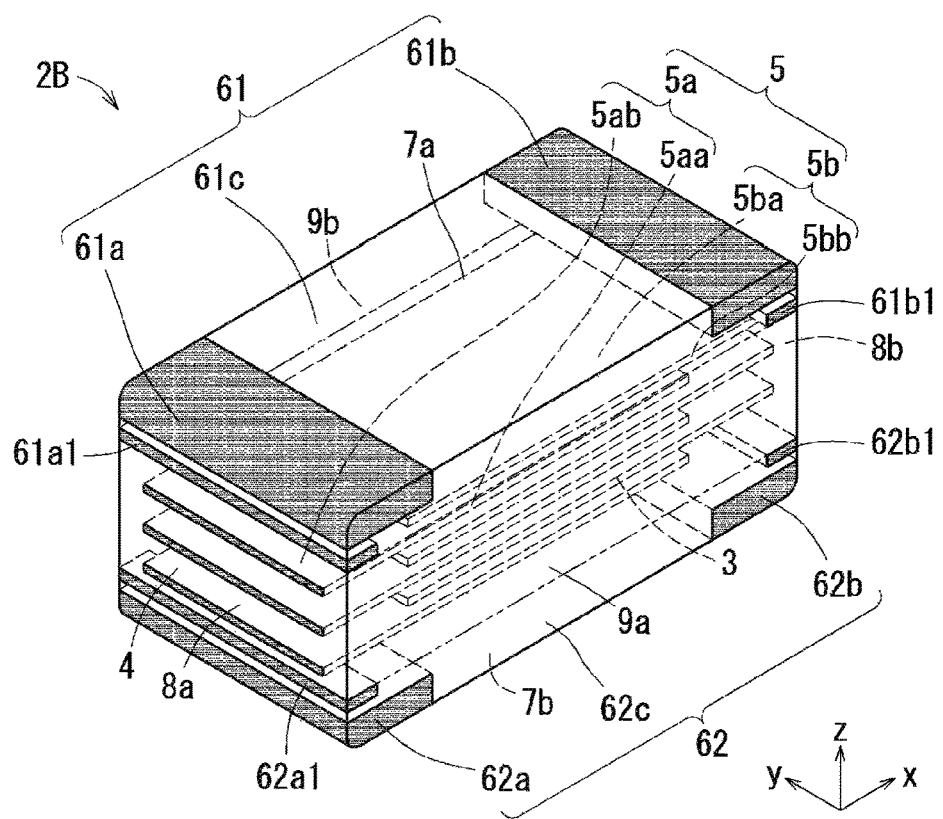
FIG. 29 is a perspective view illustrating a laminate of a multilayer ceramic capacitor according to yet another embodiment.

FIG. 29 is a perspective view illustrating a laminate 2B of a multilayer ceramic capacitor according to yet another embodiment of the present disclosure. The present embodiment is similar to the embodiment illustrated in FIG. 20. Thus, corresponding parts are denoted by the same reference numerals, and redundant description is omitted. In the present embodiment, the intermediate dummy electrodes 61*a*1, 61*b*1, 62*a*1, and 62*b*1 may be further provided for four dummy electrodes 61*a*, 61*b*, 62*c*, and 62*d* included in the first covering portion 61 in the multilayer ceramic capacitor. The intermediate dummy electrodes 61*a*1 and 61*b*1 may be provided, for example, such that intermediate dummy electrodes 61*a*1 and 61*b*1 are respectively provided inside (on the lower side of) the first and second dummy electrodes 61*a* and 61*b* in the third direction (z axis direction) between the first and second dummy electrodes 61*a* and 61*b* and electrode layers close to the first and second dummy electrodes 61*a* and 61*b*. The intermediate dummy electrodes 62*a*1 and 62*b*1 are electrically insulated from each other by a dielectric layer formed of a dielectric material which is the same as or similar to the material of the dielectric portion. The dielectric layer may be formed of a ceramic material. The intermediate dummy electrodes 62*a*1 and 62*b*1 may be provided such that the intermediate dummy electrodes 62*a*1 and 62*b*1 are respectively provided inside (on the upper side of) the dummy electrodes 34*a*, 34*b*, 34*c*, and 34*d* included in the second covering portion 62 between the third and fourth dummy electrodes 62*a* and 62*b* and electrode layers close to the third and fourth dummy electrodes 62*a* and 62*b*. Thus, the areas of exposed portions of the dummy electrodes can be increased in the end surfaces and the side surfaces. Accordingly, the reliability of the multilayer ceramic capacitor can be effectively improved.

In plan view, the shape of the intermediate dummy electrodes 61*a*1, 61*b*1, 62*a*1, and 62*b*1 may be the same as or different from the shape of the dummy electrodes 61*a*, 61*b*, 62*a*, and 62*b*. The thickness of the intermediate dummy electrodes 61*a*1, 61*b*1, 62*a*1, and 62*b*1 may be greater than the thickness of dummy electrodes 61*a*, 61*b*, 62*a*, and 62*b* in the third direction (z axis direction). The dimensions of the dummy electrodes 61*a*, 61*b*, 62*a*, and 62*b* may be substantially the same. The intermediate dummy electrodes 61*a*1, 61*b*1, 62*a*1, and 62*b*1 may be formed of the metal material used to form the dummy electrodes 61*a*, 61*b*, 62*a*, and 62*b*. When the intermediate dummy electrodes 61*a*1, 61*b*1, 62*a*1, and 62*b*1 are positioned between the active portion 3 and the covering portions 61 and 62, the plating film is likely to be formed from the active portion to the main surface side.

In the multilayer ceramic capacitor according to the present disclosure, the bonding strength between the laminate and the eternal electrodes can be improved and the occurrences of interlayer peeling in the covering portions can be suppressed. Thus, with the multilayer ceramic capacitor according to the present disclosure, a multilayer ceramic capacitor with improved reliability can be provided.

According to the present disclosure, a multilayer ceramic capacitor can be implemented in configurations (1) to (10) below.

(1) A multilayer ceramic capacitor includes a laminate having a substantially rectangular parallelepiped shape. The laminate includes an active portion formed by alternately laminating dielectric layers and internal electrode layers, a first covering portion and a second covering portion that are positioned at respective ends of the active portion in a laminating direction of the dielectric layers and the internal electrode layers, a first surface and a second surface that face each other in the laminating direction, a first end surface and a second end surface that face each other, and a first side surface and a second side surface that face each other. The multilayer ceramic capacitor also includes a first external electrode extending from the first end surface to the first surface, the second surface, the first side surface, and the second side surface, and a second external electrode extending from the second end surface to the first surface, the second surface, the first side surface, and the second side surface. The first external electrode and the second external electrode are connected to different internal electrode layers out of the internal electrode layers. The first covering portion includes a first dielectric portion and a first dummy electrode and a second dummy electrode positioned at respective ends of the first dielectric portion in a first direction perpendicular to the first end surface. The second covering portion includes a second dielectric portion and a third dummy electrode and a fourth dummy electrode positioned at respective ends of the second dielectric portion in the first direction. The first dummy electrode and the third dummy electrode are exposed at the first end surface, and the second dummy electrode and the fourth dummy electrode are exposed at the second end surface. At least one selected from the group consisting of the first dummy electrode, the second dummy electrode, the third dummy electrode, and the fourth dummy electrode has a greater thickness than a thickness of the internal electrode layers.

(2) In the multilayer ceramic capacitor according to configuration (1) described above, the first dummy electrode and the second dummy electrode are further exposed at the first surface, and the third dummy electrode and the fourth dummy electrode are further exposed at the second surface.

(3) In the multilayer ceramic capacitor according to configuration (1) or (2) described above, the first dummy electrode and the second dummy electrode are further exposed at the first side surface and the second side surface, and the third dummy electrode and the fourth dummy electrode are further exposed at the first side surface and the second side surface.

(4) In the multilayer ceramic capacitor according to any one of configurations (1) to (3) described above, the at least one selected from the group consisting of the first dummy electrode, the second dummy electrode, the third dummy electrode, and the fourth dummy electrode includes a plurality of dummy electrode layers that are laminated.

(5) In the multilayer ceramic capacitor according to configuration (4) described above, the plurality of dummy electrode layers include a ceramic-material consisting of a dielectric material.

(6) In the multilayer ceramic capacitor according to any one of configurations (1) to (5) described above, an interface between the first dielectric portion and at least one of the first dummy electrode or the second dummy electrode includes an uneven structure, and an interface between the second dielectric portion and at least one of the third dummy electrode or the fourth dummy electrode includes an uneven structure.

(7) In the multilayer ceramic capacitor according to any one of configurations (1) to (6) described above, the first covering portion further includes a fifth dummy electrode and a sixth dummy electrode positioned at respective ends of the first dielectric portion in the first direction, and the second covering portion further includes a seventh dummy electrode and an eighth dummy electrode positioned at respective ends of the second dielectric portion in the first direction. The fifth dummy electrode and the seventh dummy electrode are exposed at the first end surface, and the sixth dummy electrode and the eighth dummy electrode are exposed at the second end surface.

(8) In the multilayer ceramic capacitor according to configuration (7) described above, the first dummy electrode, the second dummy electrode, the fifth dummy electrode, and the sixth dummy electrode are further exposed at the first surface, and the third dummy electrode, the fourth dummy electrode, the seventh dummy electrode, and the eighth dummy electrode are further exposed at the second surface.

(9) In the multilayer ceramic capacitor according to configuration (7) or (8) described above, the first dummy electrode and the second dummy electrode are further exposed at the first side surface, the fifth dummy electrode and the sixth dummy electrode are further exposed at the second side surface, the third dummy electrode and the fourth dummy electrode are further exposed at the first side surface, and the seventh dummy electrode and the eighth dummy electrode are further exposed at the second side surface.

(10) The multilayer ceramic capacitor according to any one of configurations (1) to (9) described above, further includes a first intermediate dummy electrode that is positioned between the first dummy electrode and the internal electrode layers in the laminating direction and has a greater thickness than the thickness of the internal electrode layers, a second intermediate dummy electrode that is positioned between the second dummy electrode and the internal electrode layers in the laminating direction and has a greater thickness than the thickness of the internal electrode layers, a third intermediate dummy electrode that is positioned between the third dummy electrode and the internal electrode layers in the laminating direction and has a greater thickness than the thickness of the internal electrode layers, and a fourth intermediate dummy electrode that is positioned between the fourth dummy electrode and the internal electrode layers in the laminating direction and has a greater thickness than the thickness of the internal electrode layers.

Although the embodiments according to the present disclosure have been described in detail, the present disclosure is not limited to the above-described embodiments. Various changes, improvements, and the like are possible without departing from the gist of the present disclosure. It is needless to say that all or part of the elements included in the above-described embodiments can be appropriately combined with each other without contradiction with each other.

What is claimed is:

1. A multilayer ceramic capacitor comprising:
   a laminate having a substantially rectangular parallelepiped shape, the laminate including
   an active portion formed by alternately laminating dielectric layers and internal electrode layers,
   a first covering portion and a second covering portion that are positioned at respective ends of the active portion in a laminating direction of the dielectric layers and the internal electrode layers,
   a first surface and a second surface that face each other in the laminating direction,
   a first end surface and a second end surface that face each other, and
   a first side surface and a second side surface that face each other;
   a first external electrode extending from the first end surface to the first surface and the second surface; and
   a second external electrode extending from the second end surface to the first surface and the second surface,
   wherein the first external electrode and the second external electrode are connected to different internal electrode layers out of the internal electrode layers,
   wherein the first covering portion includes
      a first dielectric portion and
      a first dummy electrode and a second dummy electrode positioned at respective ends of the first dielectric portion in a first direction perpendicular to the first end surface, and
   the second covering portion includes
      a second dielectric portion and
      a third dummy electrode and a fourth dummy electrode positioned at respective ends of the second dielectric portion in the first direction,
   wherein the first dummy electrode and the third dummy electrode are exposed at the first end surface, and the second dummy electrode and the fourth dummy electrode are exposed at the second end surface, and
   wherein at least one selected from the group consisting of the first dummy electrode, the second dummy electrode, the third dummy electrode, and the fourth dummy electrode has a greater thickness than a thickness of the internal electrode layers,
   wherein the at least one of the first dummy electrode and the second dummy electrode includes
      a plurality of dummy electrode layers that are directly laminated on top of each other, and
      an uneven structure at an interface with a part of the first dielectric portion located on a central side of the first covering portion in the first direction, and
   wherein the at least one of the third dummy electrode and the fourth dummy electrode includes
      a plurality of dummy electrode layers that are directly laminated on top of each other, and
      an uneven structure at an interface with a part of the second dielectric portion located on a central side of the second covering portion in the first direction.

2. The multilayer ceramic capacitor according to claim 1, wherein the first dummy electrode and the second dummy electrode are further exposed at the first surface, and the third dummy electrode and the fourth dummy electrode are further exposed at the second surface.

3. The multilayer ceramic capacitor according to claim 1, wherein the first dummy electrode and the second dummy electrode are further exposed at the first side surface and the second side surface, and the third dummy electrode and the fourth dummy electrode are further exposed at the first side surface and the second side surface.

4. The multilayer ceramic capacitor according to claim 1, wherein the first covering portion further includes
a fifth dummy electrode and a sixth dummy electrode positioned at respective ends of the first dielectric portion in the first direction, and
the second covering portion further includes
a seventh dummy electrode and an eighth dummy electrode positioned at respective ends of the second dielectric portion in the first direction, and
wherein the fifth dummy electrode and the seventh dummy electrode are exposed at the first end surface, and the sixth dummy electrode and the eighth dummy electrode are exposed at the second end surface.

5. The multilayer ceramic capacitor according to claim 4, wherein the first dummy electrode, the second dummy electrode, the fifth dummy electrode, and the sixth dummy electrode are further exposed at the first surface, and
the third dummy electrode, the fourth dummy electrode, the seventh dummy electrode, and the eighth dummy electrode are further exposed at the second surface.

6. The multilayer ceramic capacitor according to claim 4, wherein the first dummy electrode and the second dummy electrode are further exposed at the first side surface,
the fifth dummy electrode and the sixth dummy electrode are further exposed at the second side surface,
the third dummy electrode and the fourth dummy electrode are further exposed at the first side surface, and
the seventh dummy electrode and the eighth dummy electrode are further exposed at the second side surface.

7. The multilayer ceramic capacitor according to claim 1, further comprising:
a first intermediate dummy electrode positioned between the first dummy electrode and the internal electrode layers in the laminating direction, the first intermediate dummy electrode having a greater thickness than the thickness of the internal electrode layers;
a second intermediate dummy electrode positioned between the second dummy electrode and the internal electrode layers in the laminating direction, the second intermediate dummy electrode having a greater thickness than the thickness of the internal electrode layers;
a third intermediate dummy electrode positioned between the third dummy electrode and the internal electrode layers in the laminating direction, the third intermediate dummy electrode having a greater thickness than the thickness of the internal electrode layers; and
a fourth intermediate dummy electrode positioned between the fourth dummy electrode and the internal electrode layers in the laminating direction, the fourth intermediate dummy electrode having a greater thickness than the thickness of the internal electrode layers.

8. The multilayer ceramic capacitor according to claim 1, Wherein each of the first external electrode and the second external electrode includes a plated film having a region that is in direct contact with the dielectric layers.

9. The multilayer ceramic capacitor according to claim 1, Wherein the first dummy electrode is continuously exposed from the first end surface to the first surface,
the second dummy electrode is continuously exposed from the second end surface to the first surface,
the third dummy electrode is continuously exposed from the first end surface to the second surface, and
the fourth dummy electrode is continuously exposed from the second end surface to the second surface.

10. The multilayer ceramic capacitor according to claim 1,
wherein the first dummy electrode and the second dummy electrode are embedded in the first covering portion, and
the third dummy electrode and the fourth dummy electrode are embedded in the second covering portion.

11. The multilayer ceramic capacitor according to claim 9,
wherein the first dummy electrode and the second dummy electrode are embedded in the first covering portion, and
the third dummy electrode and the fourth dummy electrode are embedded in the second covering portion.

12. A multilayer ceramic capacitor comprising:
a laminate having a substantially rectangular parallelepiped shape, the laminate including
an active portion formed by alternately laminating dielectric layers and internal electrode layers,
a first covering portion and a second covering portion that are positioned at respective ends of the active portion in a laminating direction of the dielectric layers and the internal electrode layers,
a first surface and a second surface that face each other in the laminating direction,
a first end surface and a second end surface that face each other, and
a first side surface and a second side surface that face each other;
a first external electrode extending from the first end surface to the first surface and the second surface; and
a second external electrode extending from the second end surface to the first surface and the second surface,
wherein: the first external electrode and the second external electrode are connected to different internal electrode layers out of the internal electrode layers,
wherein the first covering portion includes
a first dielectric portion and
a first dummy electrode and a second dummy electrode positioned at respective ends of the first dielectric portion in a first direction perpendicular to the first end surface, and
the second covering portion includes
a second dielectric portion and
a third dummy electrode and a fourth dummy electrode positioned at respective ends of the second dielectric portion in the first direction,
wherein the first dummy electrode and the third dummy electrode are exposed at the first end surface, and the second dummy electrode and the fourth dummy electrode are exposed at the second end surface, and
wherein at least one selected from the group consisting of the first dummy electrode, the second dummy electrode, the third dummy electrode, and the fourth dummy electrode has a greater thickness than a thickness of the internal electrode layers
wherein at least one of the first dummy electrode, the second dummy electrode, the third dummy electrode, and the fourth dummy electrode contains more ceramic-material consisting of a dielectric material than the internal electrode layers.

13. The multilayer ceramic capacitor according to claim 12,
wherein the at least one selected from the group consisting of the first dummy electrode, the second dummy electrode, the third dummy electrode, and the fourth dummy electrode includes a plurality of dummy electrode layers that are directly laminated on top of each other.

14. The multilayer ceramic capacitor according to claim 13,
wherein the plurality of dummy electrode layers include a ceramic-material consisting of a dielectric material.

15. The multilayer ceramic capacitor according to claim 12,
wherein an interface between the first dielectric portion and at least one of the first dummy electrode or the second dummy electrode includes an uneven structure, and
an interface between the second dielectric portion and at least one of the third dummy electrode or the fourth dummy electrode includes a respective uneven structure.

16. A multilayer ceramic capacitor comprising:
a laminate having a substantially rectangular parallelepiped shape, the laminate including
an active portion formed by alternately laminating dielectric layers and internal electrode layers,
a first covering portion and a second covering portion that are positioned at respective ends of the active portion in a laminating direction of the dielectric layers and the internal electrode layers,
a first surface and a second surface that face each other in the laminating direction,
a first end surface and a second end surface that face each other, and
a first side surface and a second side surface that face each other;
a first external electrode extending from the first end surface to the first surface and the second surface; and
a second external electrode extending from the second end surface to the first surface and the second surface,
wherein the first external electrode and the second external electrode are connected to different internal electrode layers out of the internal electrode layers,
wherein the first covering portion includes
a first dielectric portion and
a first dummy electrode and a second dummy electrode positioned at respective ends of the first dielectric portion in a first direction perpendicular to the first end surface, and
the second covering portion includes
a second dielectric portion and
a third dummy electrode and a fourth dummy electrode positioned at respective ends of the second dielectric portion in the first direction,
wherein the first dummy electrode and the third dummy electrode are exposed at the first end surface, and the second dummy electrode and the fourth dummy electrode are exposed at the second end surface,
wherein the first dummy electrode and the third dummy electrode are asymmetric with respect to the active portion, and
wherein at least one of the first dummy electrode, the second dummy electrode, the third dummy electrode, and the fourth dummy electrode contains more ceramic-material consisting of a dielectric material than the internal electrode layers.

17. The multilayer ceramic capacitor according to claim 16, wherein a volume of the first dummy electrode is greater than a volume of the third dummy electrode.

18. The multilayer ceramic capacitor according to claim 16, wherein a thickness of the first dummy electrode is greater than a thickness of the third dummy electrode.

* * * * *